(12) United States Patent
Williams et al.

(10) Patent No.: US 11,270,352 B2
(45) Date of Patent: Mar. 8, 2022

(54) LAUNCH PLATFORM METHODS AND DEVICES

(71) Applicants: Ronald Williams, Brooklyn, NY (US); Edmond DeFrank, Northridge, CA (US); Carl Michael Arnsby, Jr., Beverly Hills, CA (US); Russell Todd Johnson, Delray Beach, FL (US)

(72) Inventors: Ronald Williams, Brooklyn, NY (US); Edmond DeFrank, Northridge, CA (US); Carl Michael Arnsby, Jr., Beverly Hills, CA (US); Russell Todd Johnson, Delray Beach, FL (US)

( * ) Notice: Subject to any disclaimer, the term of this patent is extended or adjusted under 35 U.S.C. 154(b) by 0 days.

(21) Appl. No.: 16/589,872

(22) Filed: Oct. 1, 2019

(65) Prior Publication Data
US 2021/0097581 A1   Apr. 1, 2021

(51) Int. Cl.
*G06Q 30/00* (2012.01)
*G06Q 30/02* (2012.01)

(52) U.S. Cl.
CPC ..... *G06Q 30/0276* (2013.01); *G06Q 30/0201* (2013.01); *G06Q 30/0204* (2013.01); *G06Q 30/0242* (2013.01); *G06Q 30/0253* (2013.01)

(58) Field of Classification Search
CPC .......... G06Q 30/0276; G06Q 30/0201; G06Q 30/0202
See application file for complete search history.

(56) References Cited

U.S. PATENT DOCUMENTS

| | | | | |
|---|---|---|---|---|
| 2016/0086128 | A1* | 3/2016 | Geiger | G06Q 10/063118 705/7.17 |
| 2016/0300187 | A1* | 10/2016 | Kashi | G06Q 10/0836 |
| 2017/0116667 | A1* | 4/2017 | High | G06K 9/00671 |
| 2017/0178223 | A1* | 6/2017 | Ranasinghe | G06Q 30/0271 |
| 2017/0293301 | A1* | 10/2017 | Myslinski | B64C 39/024 |
| 2018/0204243 | A1* | 7/2018 | Haaland | G06Q 30/0243 |
| 2019/0026786 | A1* | 1/2019 | Khoury | G06Q 30/0271 |
| 2019/0297045 | A1* | 9/2019 | Orsini | H04L 67/26 |
| 2020/0008050 | A1* | 1/2020 | Freeman | G08B 5/36 |

* cited by examiner

*Primary Examiner* — Meredith A Long
(74) *Attorney, Agent, or Firm* — Edmond DeFrank

(57) ABSTRACT

The embodiments disclose a method, including gathering marketing data using a digital launch platform with artificial intelligence for automatically analyzing marketing data gathered and automatically creating a marketing program for launching a new product, using application programming interface systems on the digital launch platform for interfacing across multiple social media platforms for reaching consumers regardless of their user digital device type and operating system, using at least one digital launch platform user interface for consumer/end user ordering and purchasing the new product, and delivering the new product order to the end user customer using secure delivery methods and devices electronically coupled to the digital launch platform including launch platform delivery lockers with delivery package label barcode scanning activated pass code key pads, drone captured video of home and office deliveries or mobile dispensary customer GPS location deliveries or mobile dispensary customer GPS location deliveries.

10 Claims, 27 Drawing Sheets

LAUNCH PLATFORM METHODS AND DEVICES

BACKGROUND

Many consumers have begun ordering on line in lieu of shopping at brick and mortar stores. The marketing appeal of the expanded media selections may appeal to one consumer demographic and not another. Product retailers may be confused with the technologies available and how to effectively market their products through the various marketing media for their intended consumer group and setup secure delivery options for their customers. Consumer preferences on marketing outlets on differing technologies are shifting along with wanting more convenience in shopping and product deliveries options. Home deliveries are plagued more and more with front porch thefts.

DETAILED DESCRIPTION OF THE INVENTION

In a following description, reference is made to the accompanying drawings, which form a part hereof, and in which is shown by way of illustration a specific example in which the invention may be practiced. It is to be understood that other embodiments may be utilized and structural changes may be made without departing from the scope of the present invention.

General Overview:

It should be noted that the descriptions that follow, for example, in terms of a launch platform methods and devices is described for illustrative purposes and the underlying system can apply to any number and multiple types marketing media and products. In one embodiment of the present invention, the launch platform methods and devices can be configured using various marketing media technologies and advertising formats. The launch platform methods and devices can be configured to include secure home delivery of purchased products and can be configured to include secure customer pick-up locations and methods using the present invention.

Figure 1:
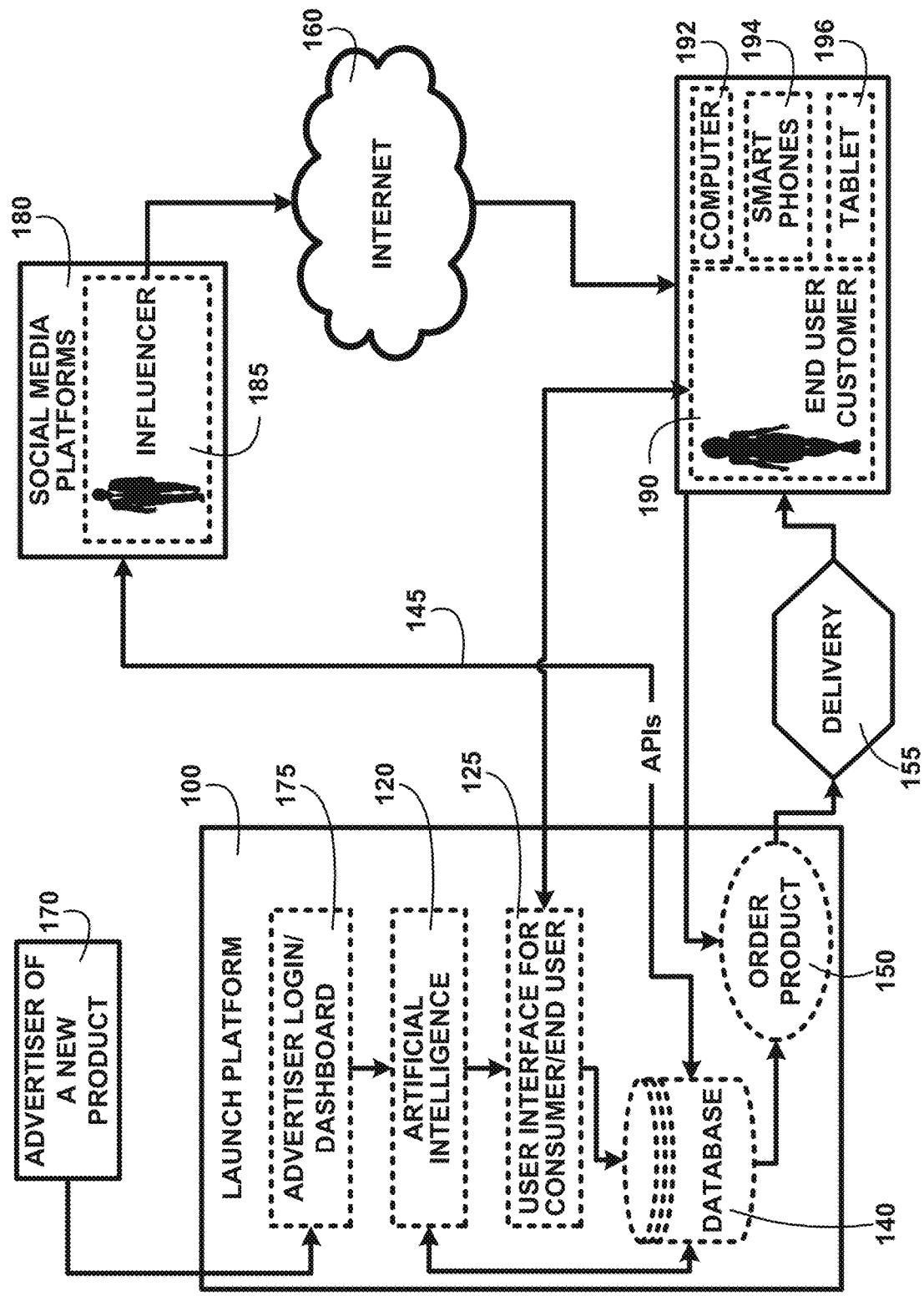
FIG. 1 shows for illustrative purposes only an example of an overview of a launch platform methods and devices of one embodiment.

General Overview:

FIG. 1 shows for illustrative purposes only an example of an overview of launch platform methods and devices of one embodiment. FIG. 1 shows the launch platform methods and devices being used for an advertiser of a new product 170. The launch platform methods and devices are using a digital launch platform 100 for automatic data gathering, automatically analyzing marketing data gathered and automatically creating a marketing program. Data gathering is automatically recorded on at least one database. The launch platform 100 includes an advertiser login/dashboard 175 interface for the advertiser of a new product 170 to be interactive with the launch platform 100. The launch platform methods and devices are using artificial intelligence 120 utilizing at least one digital processor for the data analysis and formulating new marketing plans, means and advertising formats for launching a new product, including accurate budgets, effectiveness evaluations and sales projections.

The launch platform methods and devices includes at least one user interface for consumer/end user 125 for interfacing consumers and end users of a new product for ordering, product details and additional second tier advertising messages. At least one database 140 is used for data recording, ordering and purchase transactions, building a customer contact matrix and other data recording for rapid query retrieval.

A end user customer 190 may order product 150 using the at least one user interface for consumer/end user 125 that will communicate with the end user customer 190 digital device including a computer 192, smart phones 194, tablet 196 and other digital electronic devices. The launch platform methods and devices include secure purchasing methods to protect the customer purchasing and contact data. The artificial intelligence 120 created marketing planning may include for example development marketing placement on social media platforms 180. The marketing placement on social media platforms 180 may include an influencer 185 that the analysis will connect with a new product target consumer group demographic.

Social media platforms 180 operate on internet 160 systems that communicate with various user digital devices using multiple operating systems. The launch platform methods and devices uses Application Programming Interface systems or APIs 145 that interface across multiple social media platforms 180 allowing the artificial intelligence 120 created marketing plan to reach consumers regardless of their user digital device type and operating system. Upon ordering and purchasing a new product the launch platform methods and devices automatically sets up a delivery 155 to the end user customer 190. The end user customer 190 can select from the delivery options available upon making the order. The dates, times and method of delivery is automatically provided to the end user customer 190 via the launch platform methods and devices communication of that information to the end user customer 190 digital device in a compatible format including a text message, email and other appropriate and end user customer 190 selected choice to their computer 192, smart phones 194 and tablet 196 of one embodiment.

Figure 2:
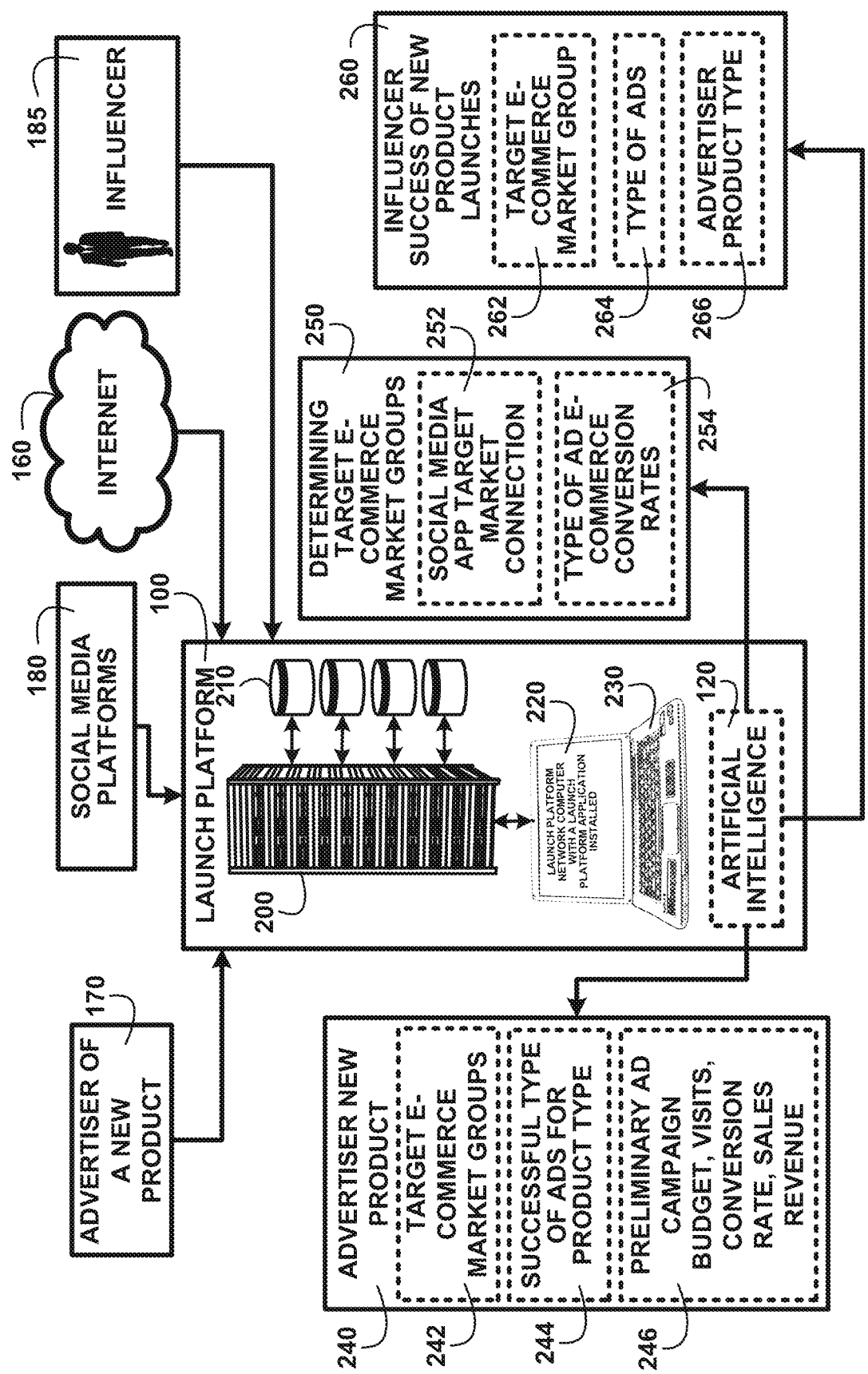
FIG. 2 shows for illustrative purposes only an example of advertiser of a new product of one embodiment.

Detailed Description:

FIG. 2 shows for illustrative purposes only an example of advertiser of new product of one embodiment. FIG. 2 shows data gathering from the advertiser of new product 170, social media platforms 180, internet 160 and data on the influencer 185 using the launch platform 100. The automatic network server 200 automatically records the data gathered on a plurality of databases 210. The network server 200 automatically transmits the data gathered for a new product to a launch platform network computer with a launch platform application installed 220. A launch platform network computer 230 initiates the artificial intelligence 120 analysis of an advertiser new product 240 to evaluate target e-commerce market groups 242. The artificial intelligence 120 analysis includes an evaluation of successful type of ads for product type 244 in categories similar to that of the new product. The evaluation of the target e-commerce market groups 242 includes creating a preliminary ad campaign budget, visits, conversion rate, and sales revenue 246 projections for determining target e-commerce market groups 250. Determining target e-commerce market groups 250 includes evaluating establishing a social media app target market connection 252 and projection of each type of ad e-commerce conversion rates 254. The artificial intelligence 120 analysis extends to include influencer success of new product launches 260, specifically with a target e-commerce market group 262 for each type of ads 264 and an advertiser product type 266 of one embodiment.

Figure 3:
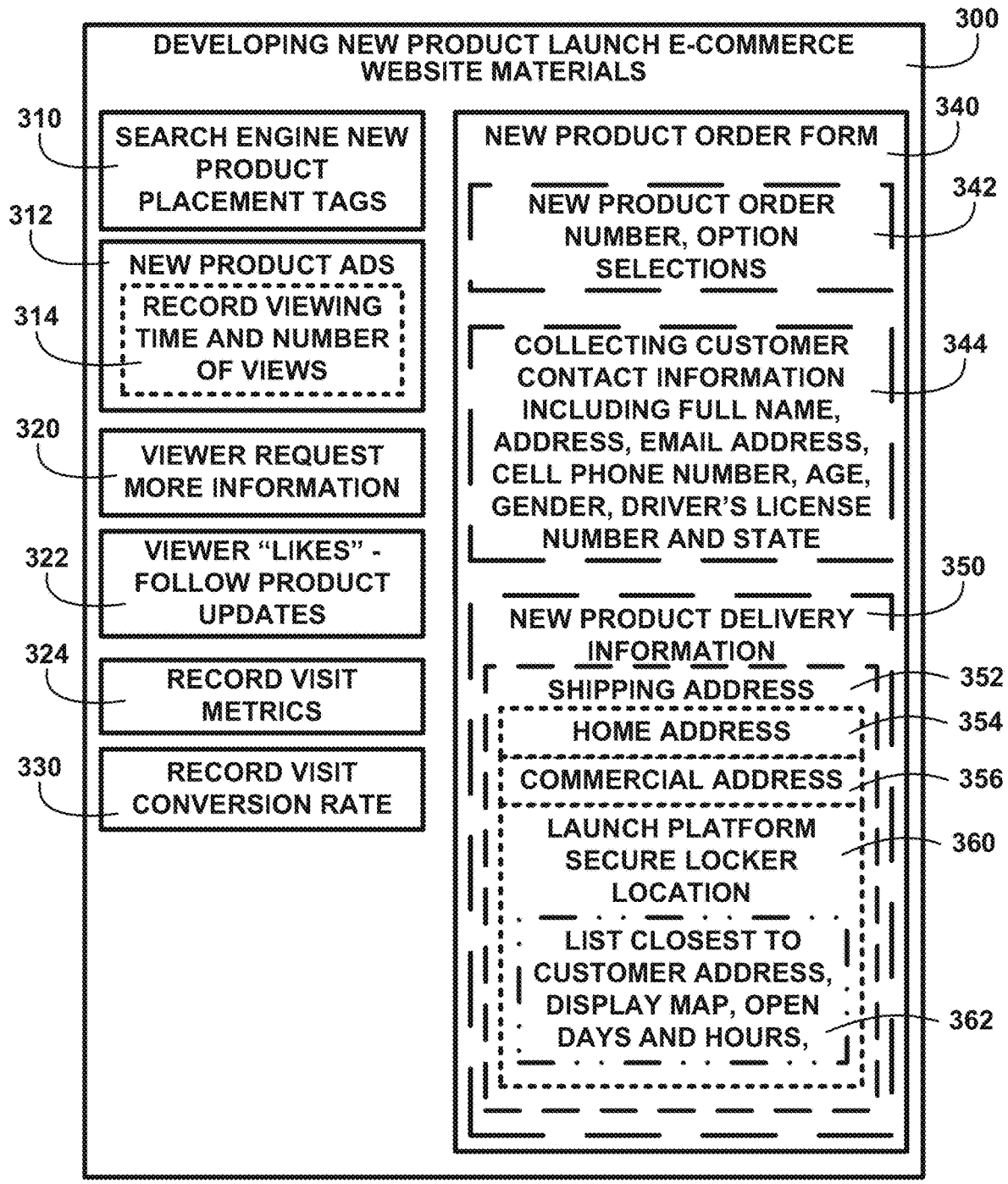
FIG. 3 shows a block diagram of an overview of developing new product launch e-commerce website materials of one embodiment.

Developing New Product Launch e-Commerce Website Materials:

FIG. 3 shows a block diagram of an overview of developing new product launch e-commerce website materials of one embodiment. FIG. 3 shows developing new product launch e-commerce website materials 300 according to the formulated new marketing plans, means and advertising formats. Developing new product launch e-commerce website materials 300 includes search engine new product placement tags 310 for effective search engine pop-ups. New product ads 312 include background data gathering including features to record viewing time and number of views 314, frequency of viewer request more information 320 hits, and viewer "likes"—follow product updates 322 on social media.

The features will record visit metrics 324 and record visit conversion rate 330 achieved from the ad. Developing new product launch e-commerce website materials 300 includes a new product order form 340 including a new product order number, option selections 342, collecting customer contact information including full name, address, email address, cell phone number, age, gender, driver's license number and state 344, photo identification, image capture of the driver's license, and new product delivery information 350. New product delivery information 350 will include a shipping address 352 including a home address 354, commercial address 356, and launch platform secure locker location 360. The end user customer 190 of FIG. 1 selection of a launch platform secure locker location 360 will automatically display on the end user customer 190 of FIG. 1 digital device to list closest to customer address, display map, open days and hours 362 from which the end user customer 190 of FIG. 1 may select their choice of location of one embodiment.

Figure 4:
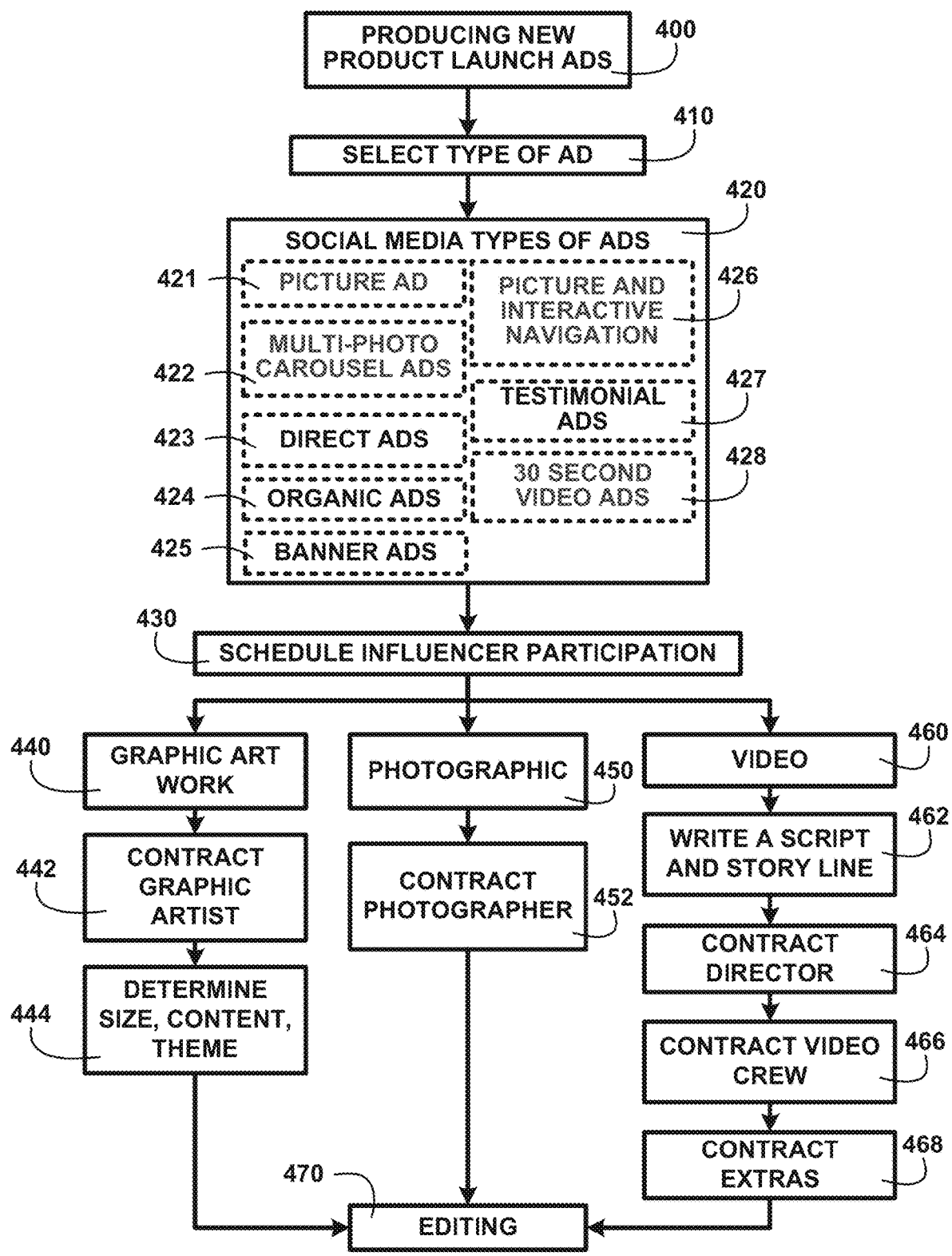
FIG. 4 shows a block diagram of an overview of producing new product launch ads of one embodiment.

Producing New Product Launch Ads:

FIG. 4 shows a block diagram of an overview of producing new product launch ads of one embodiment. FIG. 4 shows the election of the advertiser of a new product 170 for producing new product launch ads 400. Producing new product launch ads 400 includes using the artificial intelligence 120 of FIG. 1 evaluations to select type of ad 410 and social media types of ads 420. Social media types of ads 420 include picture ad 421, multi-photo carousel ads 422, direct ads 423, organic ads 424, banner ads 425, picture and interactive navigation 426, testimonial ads 427, and 30 second video ads 428. Another process step is to schedule influencer participation 430 in the ad production.

Another process area is graphic art work 440 including hiring a contract graphic artist 442 and consultations to determine size, content, theme 444 of the graphic art work 440. Another area is photographic 450 content materials and includes hiring a contract photographer 452. Arranged new product photos with appropriate themes, setting and new product images contribute to successful sales. Social media utilizes video 460 for advertising. Producing a video 460 include a script writer to write a script and story line 462. Hiring a contract director 464, contract video crew 466, contract extras 468 and editing 470 by a professional editor of one embodiment.

Figure 5:
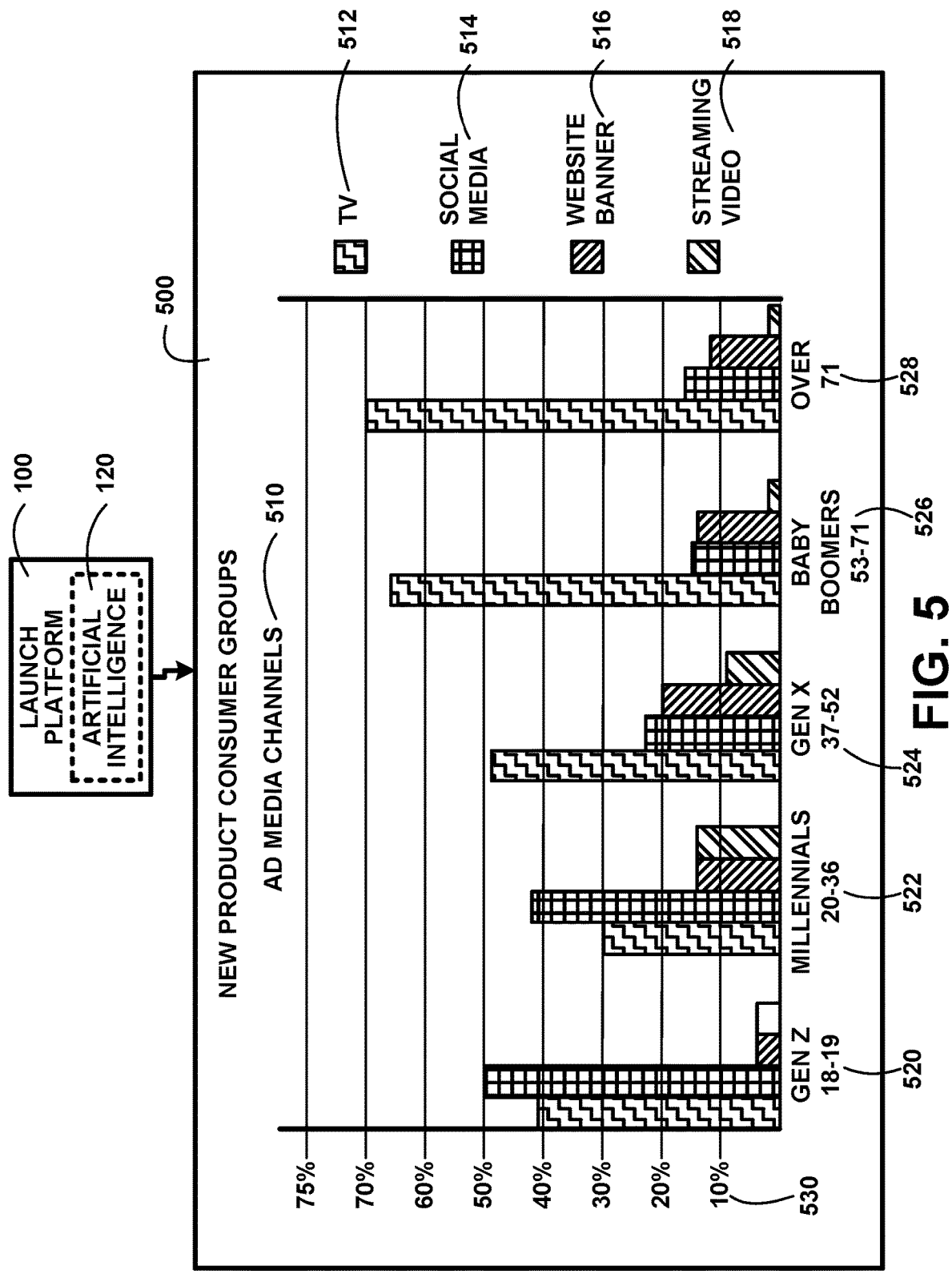
FIG. 5 shows for illustrative purposes only an example of launch platform artificial intelligence new product consumer groups of one embodiment.

Launch Platform Artificial Intelligence New Product Consumer Groups:

FIG. 5 shows for illustrative purposes only an example of launch platform artificial intelligence new product consumer groups of one embodiment. FIG. 5 shows an overview of the launch platform 100 artificial intelligence 120 analyses of data relating to new product consumer groups 500. The data analyzed includes ad media channels 510 including TV 512, social media 514, website banner 516 ads, and streaming video 518. The appeal of each of the ad media channels 510 is in part driven by how often the ad media channels 510 are viewed on a regular basis by various new product consumer groups 500.

In this example the new product consumer groups 500 are identified by social description followed by the current age range generally attributed to the consumer group for marketing. The new product consumer groups 500 in this example include gen z 18-19 520, millennials 20-36 522, gen x 37-52 524, baby boomers 53-71 526, and over 71 528. The artificial intelligence 120 analyses includes a calculation of a percentage of consumer group response to ad media channels 530 indicating which of the ad media channels 510 are most viewed by each new product consumer groups 500 of one embodiment.

Figure 6:
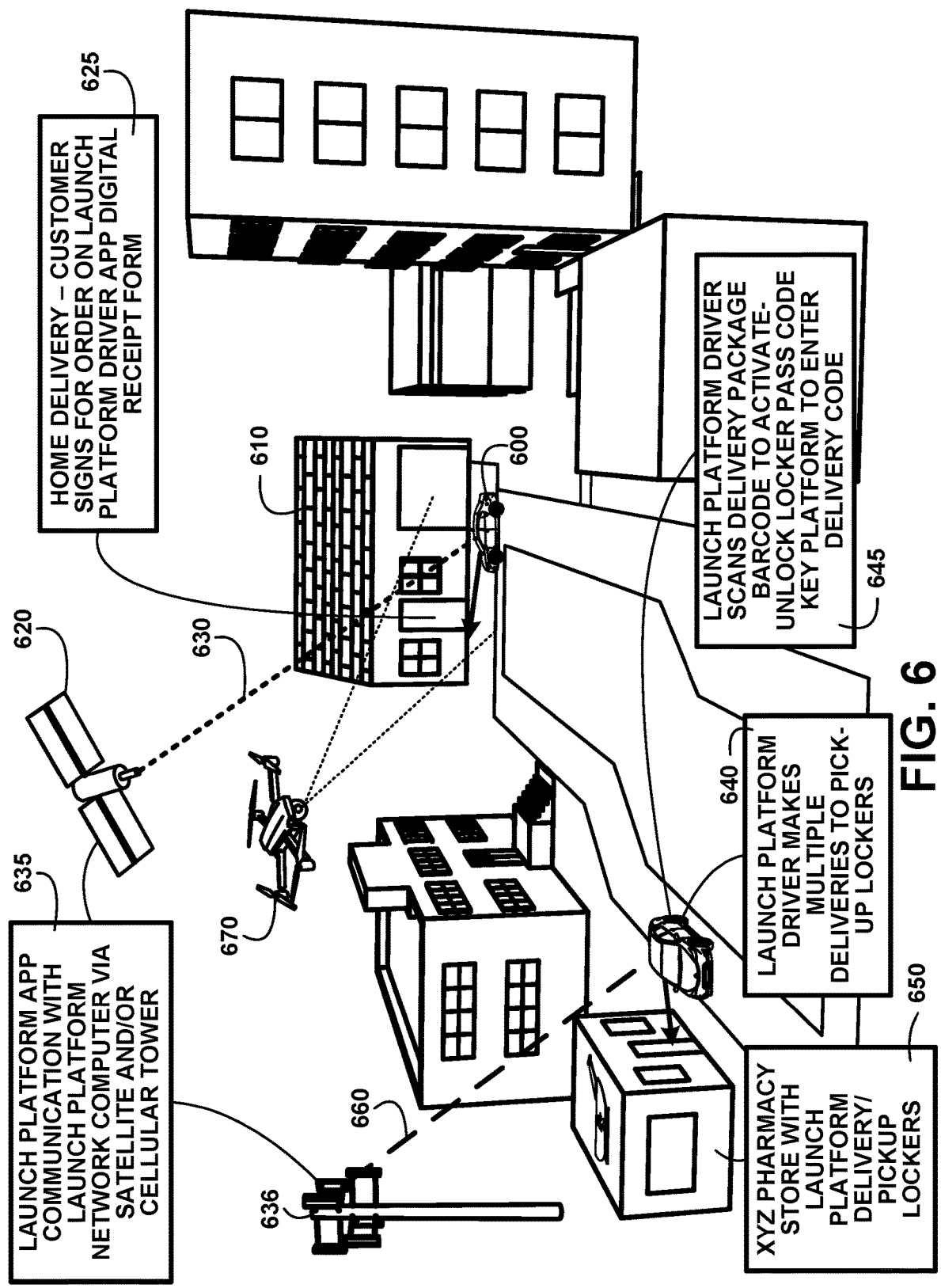
FIG. 6 shows for illustrative purposes only an example of launch platform delivery processes of one embodiment.

Launch Platform Delivery Processes:

FIG. 6 shows for illustrative purposes only an example of launch platform delivery processes of one embodiment. FIG. 6 shows a launch platform delivery vehicle 600 making a delivery to a consumer house 610 of their ordered new products. In areas where cell phone reception is poor the launch platform delivery driver's digital device is equipped with connectivity to a satellite 620. Satellite tracking of launch platform delivery 630 allows record keeping of the driver's routing and arrival following the delivery instructions transmitted to the launch platform delivery driver's digital device by the network server via a launch platform network computer. Each launch platform delivery driver undergoes a background check, provides a driver photo, camera image of their driver's license, name, license plate info, car make and model and authorization for the installation and use of a tamper proof tracking device in their vehicle, written permission and release for video image capture and broadcast rights for example from drone 670 deliver video recording. Home delivery customer signs for order on launch platform driver app digital receipt form 625. The launch platform delivery process includes a drone 670 with a camera capturing the delivery on video. The consumer will be able to view the live real-time delivery being made for example to their home using a launch platform application 772 of FIG. 7 installed on the consumer's digital device. The drone 670 flies a GPS guided flight plan that complies with all FAA and other regulatory regulations and safety precautions. The drone 670 video is automatically transmitted to the network server 200 of FIG. 2 and is recorded on the database 140 of FIG. 1. This provides a record of the actual delivery and drone 670 flight to and from the delivery site. The satellite communication connection will also record the delivery date/time and end user consumer 190 of FIG. 1 receipt signature image captured on the launch platform delivery driver's digital device for providing delivery verification/confirmation. An end user consumer may select when ordering the new product to include a delivery tip for the driver. The end user consumer may select to make a delivery tip upon or after the delivery by accessing the delivery recorded receipt on via the end user consumer digital device launch platform application 772 of FIG. 7 and entering a delivery tip amount.

A launch platform app communication with launch platform network computer via satellite and/or cellular tower 635 via the satellite 620 and/or cell tower 636 provides a level of secure delivery of ordered products. Cell tracking of delivery vehicle 660 allows recording of the driver's routing and arrival following the delivery instructions transmitted to the launch platform delivery driver's digital device by the network server via a computer. The secure customer pick-up locations are efficient since a launch platform driver makes multiple deliveries to launch platform delivery/pickup lockers 640. In this example a xyz pharmacy store with launch platform delivery/pickup lockers 650 is a secure customer pick-up location.

A launch platform driver scans delivery package barcode to activate-unlock locker pass code key pad to enter delivery code 645. Unlocking the locker pass code key pad provides security against unauthorized entry to the locker. If someone hacked the delivery code they could not unlock the locker door. The locker pass code key pad will be disabled until the correct delivery package barcode which only exists on the package itself and recorded on the network server. Once the correct delivery package barcode is scanned by the specific delivery driver's digital device only the uniquely identified locker pass code key pad will be enabled for opening by a signal transmitted by the launch platform network computer to a locker cabinet control processor. The locker cabinet control processor includes at least one digital processor, at least one digital memory device, at least one cellular connectivity device, at least one WIFI device, and a plurality of wireless digital circuit breakers with WIFI connectivity. A uniquely identified locker pass code key pad includes a RFID coupled to a locker door hinge sensor for transmitting an open and closed status, a digital processor, and a digital memory device. Upon receiving the activation code the locker cabinet control processor opens a digital circuit breaker to provide power to the uniquely identified locker pass code key pad for a predetermined time period sufficient for the delivery driver to place the package in the locker and close the door. Once the locker door is opened and then closed the digital circuit breaker is close shutting off power to the uniquely identified locker pass code key pad. This further prevents a delivery driver from depositing the delivery package into a wrong locker that might allow someone other than the rightful end user customer 190 of FIG. 1 to pick it up of one embodiment.

Figure 7:
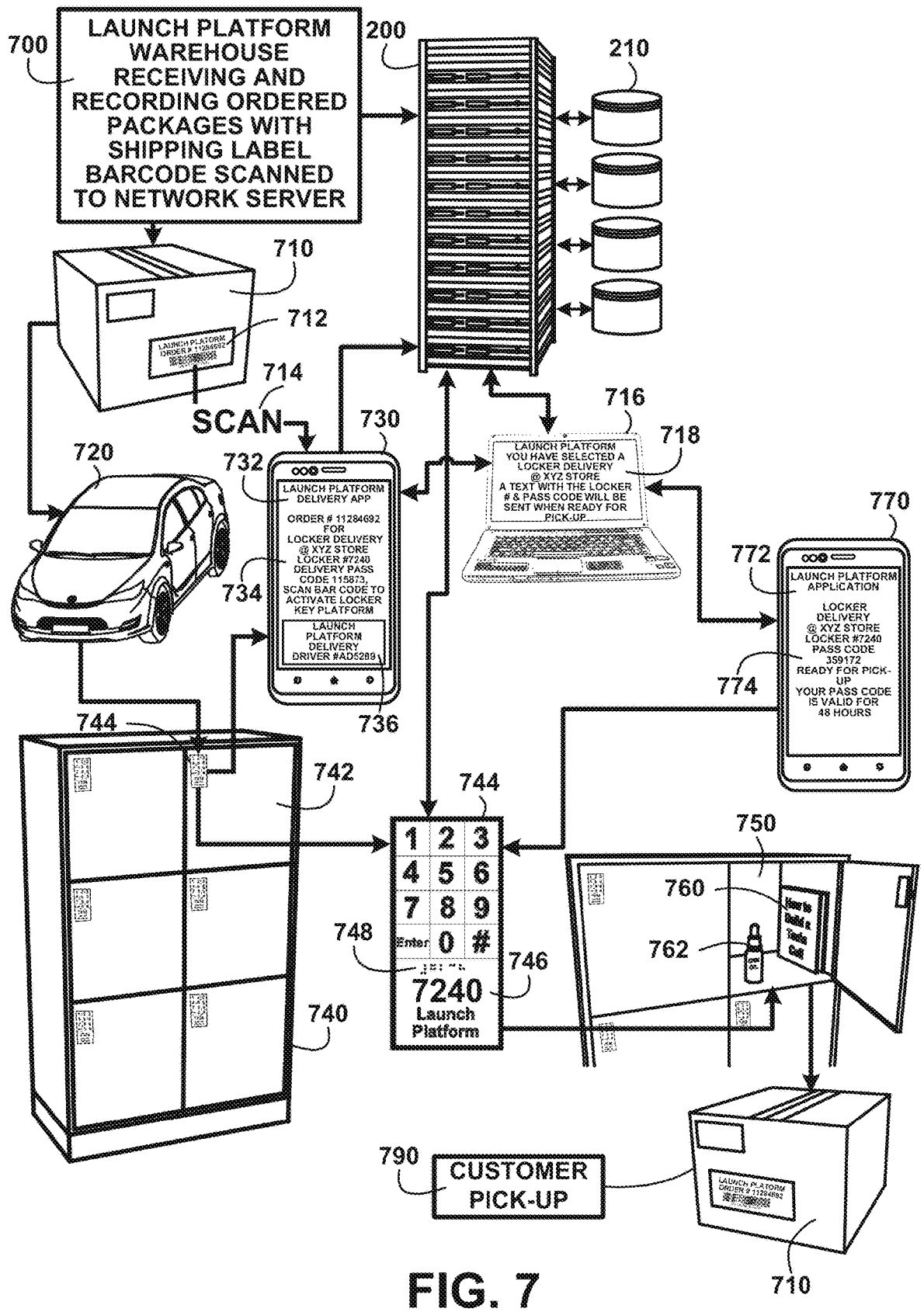
FIG. 7 shows for illustrative purposes only an example of launch platform delivery lockers of one embodiment.

Launch Platform Delivery Lockers:

FIG. 7 shows for illustrative purposes only an example of launch platform delivery lockers of one embodiment. FIG. 7 shows the network server 200 and plurality of databases 210 with receive and record automatically scanned identification data on launch platform warehouse receiving and recording ordered packages 700. A customer ordered items package 710 is uniquely identified using a launch platform shipping label 712 including a label barcode. The label barcode includes a unique code for that specific package. A package handling device not shown automatically performs a scan 714 of the shipping label barcode and transmits the scanned data to a launch platform delivery app 732 on a delivery driver's digital device 730 and transmits the delivery pick-up to the network server.

A launch platform network computer 716 automatically transmits a message for example a text message to a customer digital device 770 that "launch platform you have selected a locker delivery @ xyz store a text with the locker # & pass code will be sent when ready for pick-up 718. This message alerts the customer that delivery is underway. The delivery driver's digital device 730 with the launch platform delivery app 732 will receive delivery instructions order #11284692 for locker delivery @ xyz store locker #7240 delivery pass code 115873, scan bar code to activate locker key pad 734 when arriving at the pick-up location.

To prevent any confusion between delivery drivers each delivery driver's digital device 730 is uniquely identified for each specific driver as illustrated on the delivery driver's digital device 730 with the message "launch platform delivery driver #ad5289" 736. When the delivery package is loaded into a launch platform delivery vehicle 720 a radio-frequency identification (RFID) embedded into the delivery package label is activated by a sensor in the launch platform delivery vehicle 720 and the loading data identifying the package and vehicle ID is transmitted to the launch platform network computer.

FIG. 7 shows launch platform delivery lockers 740 including for this example the destination locker #7240 742 and locker #7240 key pad 744. The locker number 746 is clearly marked on the locker and includes a locker number in braille 748 to allow vision impaired customers to correctly identify the locker that will contain their delivery package. A customer digital device 770 with a launch platform application 772 will receive the message "locker delivery @ xyz store locker #7240 pass code 359172 ready for pick-up your pass code is valid for 48 hours" 774.

Should the end user customer 190 of FIG. 1 be unable to arrive at the locker location during the 48 hours, they can call or text the launch platform to reschedule the locker delivery. If rescheduling the pick-up occurs the assigned locker will remain locked until the pick-up is made or if the customer fails to pick-up the package on the rescheduled day they may be charged a delayed pickup fee for tying up the locker space.

As illustrated when locker #7240 is opened by the customer 750 a customer ordered item for example a book 760 and a customer ordered item for example CBD oil 762 can be seen ready to be picked up. In this example the ordered items are shown not in box for illustration purposes only. Showing is the customer ordered items package 710 which when removed from the locker and the locker door is shut the locker cabinet control processor closes the digital circuit to the locker key pad and transmits a customer pick-up 790 signal to the network server of one embodiment.

Figure 8:
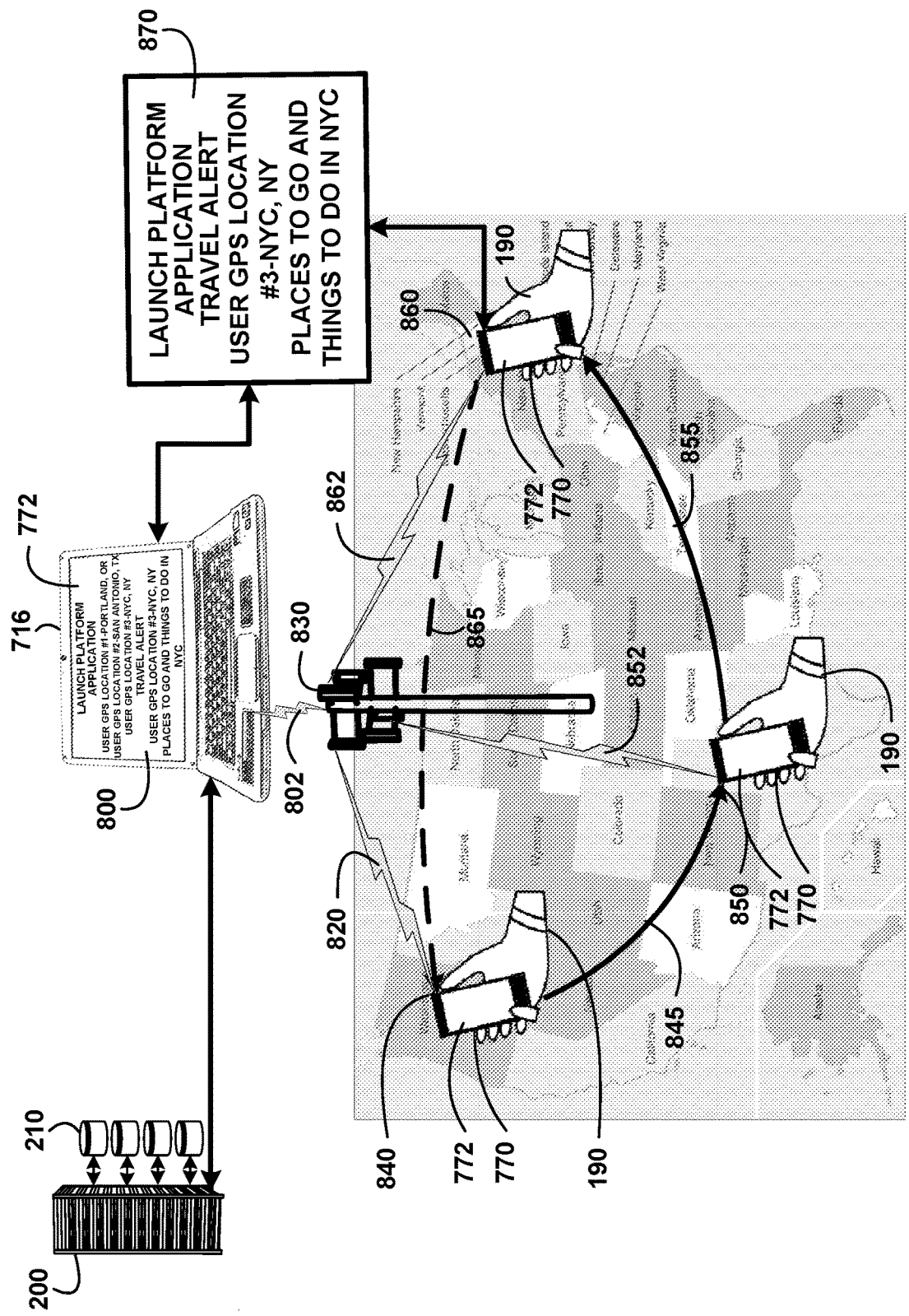
FIG. 8 shows for illustrative purposes only an example of travel alerts of one embodiment.

Travel Alerts:

FIG. 8 shows for illustrative purposes only an example of travel alerts of one embodiment. FIG. 8 shows the network server 200 with a plurality of databases 210 transmitting using the network server computer 716 travel alerts to the customer digital device 770 with the launch platform application 772. The customer digital device 770 with the launch platform application 772 transmits a user GPS location #1—Portland, Oreg. 800 received by the network server computer 716.

The user location is tracked from cell towers 802. A cellular tower 830 is currently located to permit cell service virtually everywhere. Bidirectional communication with the launch platform application 820 registers the user GPS location #1 840 for a starting point of a user's travel plans. The customer digital device 770 and launch platform application 772 shows a user travels to user GPS location #2—San Antonio, Tex. 845. User GPS location #2 850 is detected with continuing communication with the launch platform application 852.

The launch platform application 772 detects when a user travels to user GPS location #3—NYC, N.Y. 855. In this example user GPS location #3 860 is where the user has requested in advance travel alerts. Upon arrival at user GPS location #3 860 a launch platform application transmits a travel alert to user at GPS location #3—NYC, "NY places to go and things to do in NYC" 870. The user can browse the places to go and things to do in NYC listed on the customer digital device 770 from the network server 200 via the launch platform application 772. The user is free to for example purchase tickets to a Broadway show, a tour of the Statue of Liberty, make a dinner reservation at Sardi's restaurant and do all that using the launch platform application 772 including purchasing tickets and getting confirmations on reservations from the convenience of the customer digital device 770.

In other examples a user my receive automatic unrequested travel alerts that inform the user of sites to visit, locations of store and other outlets to purchase new product launch goods and services from their current locations while traveling. Continuing communication with the launch platform application 862 provides the time savings of having to find places to go and visits without any directions or knowledge of the local area. The user can read reviews; find lodging and conveniently purchase for examples gifts for friends and family members while traveling and either pick-up the gift of a new product launch or have it drone delivered to grandmother's house. The end user customer 190 can find gasoline stops and other needs as a user travels back to location #1 865 of one embodiment.

Figure 9:
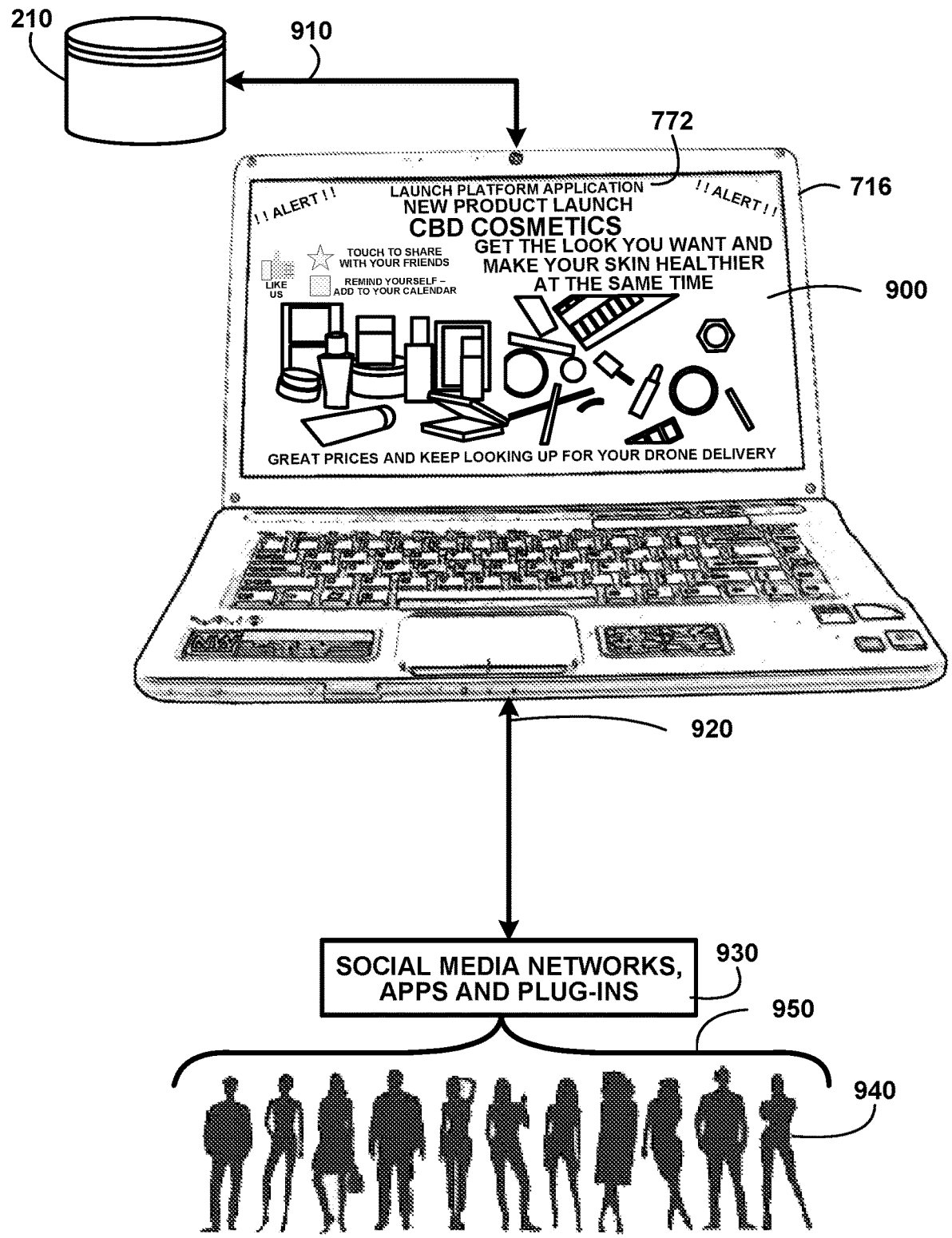
FIG. 9 shows for illustrative purposes only an example of CBD cosmetics of one embodiment.

CBD Cosmetics:

FIG. 9 shows for illustrative purposes only an example of CBD cosmetics of one embodiment. FIG. 9 shows the plurality of databases 210 with new product launch data recorded therein. New product launch data is transmitted to the 910 network server computer 716 with the launch platform application 772. In this example of new product launch for CBD cosmetics advertising loaded 900 into the network server computer 716 the CBD cosmetics advertising is transmitted to social media outlets 920. The CBD cosmetics advertising are displayed by social media networks, apps and plug-ins 930. Social media contacts receive the CBD cosmetics new launch advertising 950. One individual end user is alerted to the new product launch through their favorite social media network 940 of one embodiment.

Figure 10:
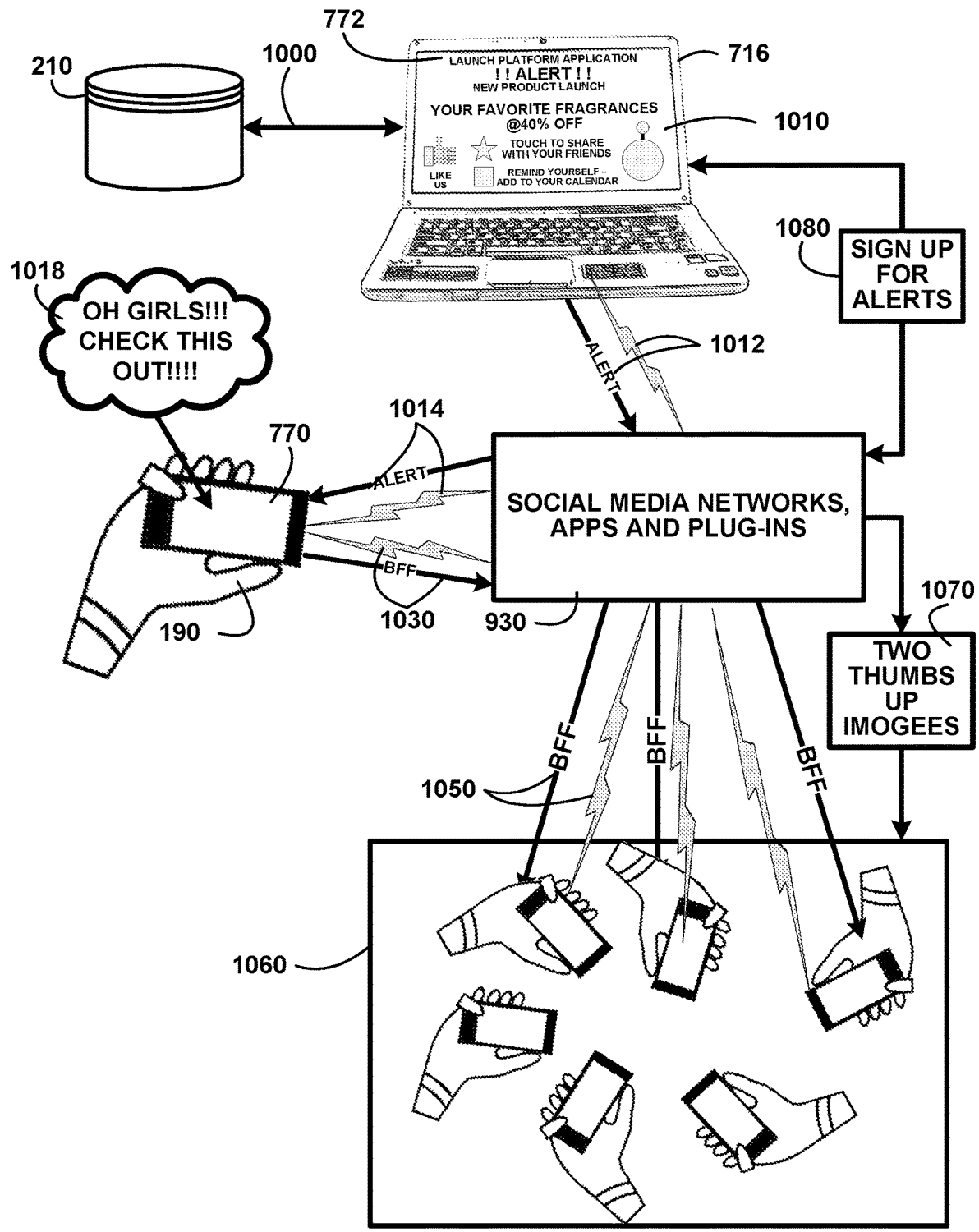
FIG. 10 shows for illustrative purposes only an example of social media networks, apps and plug-ins of one embodiment.

Social Media Networks, Apps and Plug-Ins:

FIG. 10 shows for illustrative purposes only an example of social media networks, apps and plug-ins of one embodiment. FIG. 10 shows the plurality of databases 210 with new product launch data recorded therein. A new product launch for your favorite fragrances is loaded from the database 1000 into the network server computer 716 with the launch platform application 772.

The advertising is seen on the network server computer 1010 including an "!! ALERT!!" for a "NEW PRODUCT LAUNCH" for "YOUR FAVORITE FRAGRANCES @40% OFF". The advertising continues with instructions to views that include a star shape and "TOUCH TO SHARE WITH YOUR FRIENDS". A square shape for checking yes is next to the message "REMIND YOURSELF—ADD TO YOUR CALENDAR". In addition the familiar social media imogee of a closed fist with a thumb pointing up and the suggestion "LIKE US". A new product launch alert is transmitted to social media outlets 1012 and an alert 1014 transmission is received by the end user customer 190 on the customer digital device 770.

The end user customer 190 forwards the alert 1014 to a group of her BFF 1030 friends. The popular abbreviation "BFF" means "Best Female Friend". The end user customer 190 prefixes the forwarded alert message with her own BFF 1030 announcement "Oh girls!!! Check this out!!!!" 1018. The end user customer 190 BFF 1030 announcement and "FAVORITE FRAGRANCES" new product launch alert are sent from the customer digital device 770 using the launch platform application 772. The end user customer 190 BFF 1030 announcement is transmitted through the social media networks, apps and plug-ins 930. The social media networks, apps and plug-ins 930 transmit the end user customer BFF alerts 1050 with a group of end user customer BFFs receiving the BFF alert 1060. The BFFs transmit positive response two thumbs up imogees 1070 in response. The positive responses are transmitted to the network server computer 716 and it records the new sign up for alerts 1080 from the first user end customer BFF social media contacts of one embodiment.

Figure 11A:
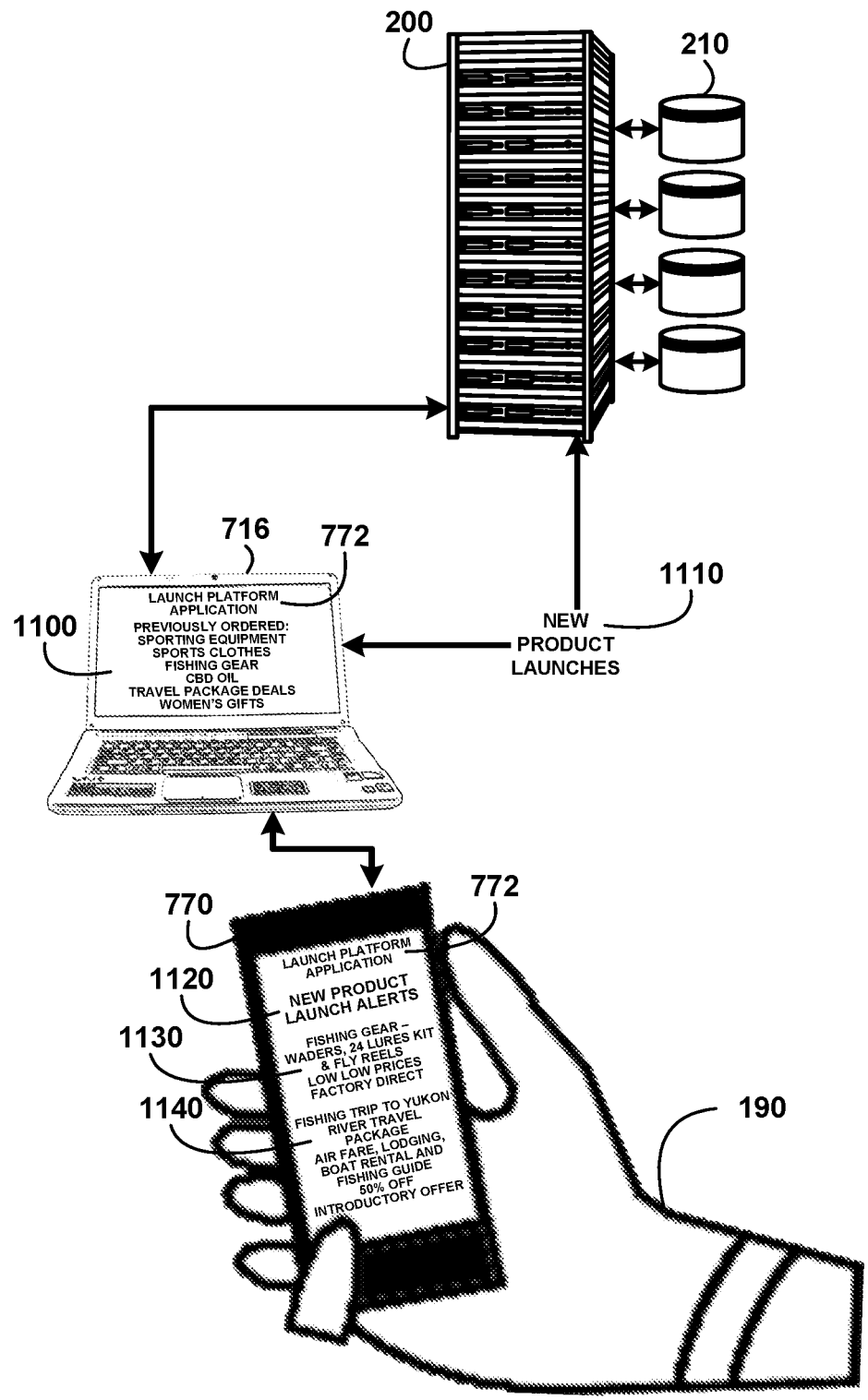
FIG. 11A shows for illustrative purposes only an example of new product launch alerts of one embodiment.

New Product Launch Alerts:

FIG. 11A shows for illustrative purposes only an example of new product launch alerts of one embodiment. FIG. 11A shows the network server 200 with the plurality of databases 210 transmitting and receiving data from the network server computer 716. The network server computer 716 has the launch platform application 772 installed. The launch platform application 772 receives new product launches 1110 and end user purchase history data from the network server 200. The network server computer 716 transmits to the customer digital device 770 new product launch alerts 1120 based on the end user customer 190 previously ordered: sporting equipment, sports clothes, fishing gear, CBD oil, travel package deals, and women's gifts 1100.

The selected new product launches 1110 based on similar purchases of the end user customer 190 are transmitted as new product launch alerts 1120 to the customer digital device 770. The new product launch alerts 1120 include fishing gear waders, 24 lures kit & fly reels low low prices factory direct 1130 and a fishing trip to Yukon river travel package air fare, lodging, boat rental and fishing guide 50% off introductory offer 1140. These new product launch alerts 1120 and sent to the end user customer 190 using the launch platform application 772 of one embodiment.

Figure 11B:
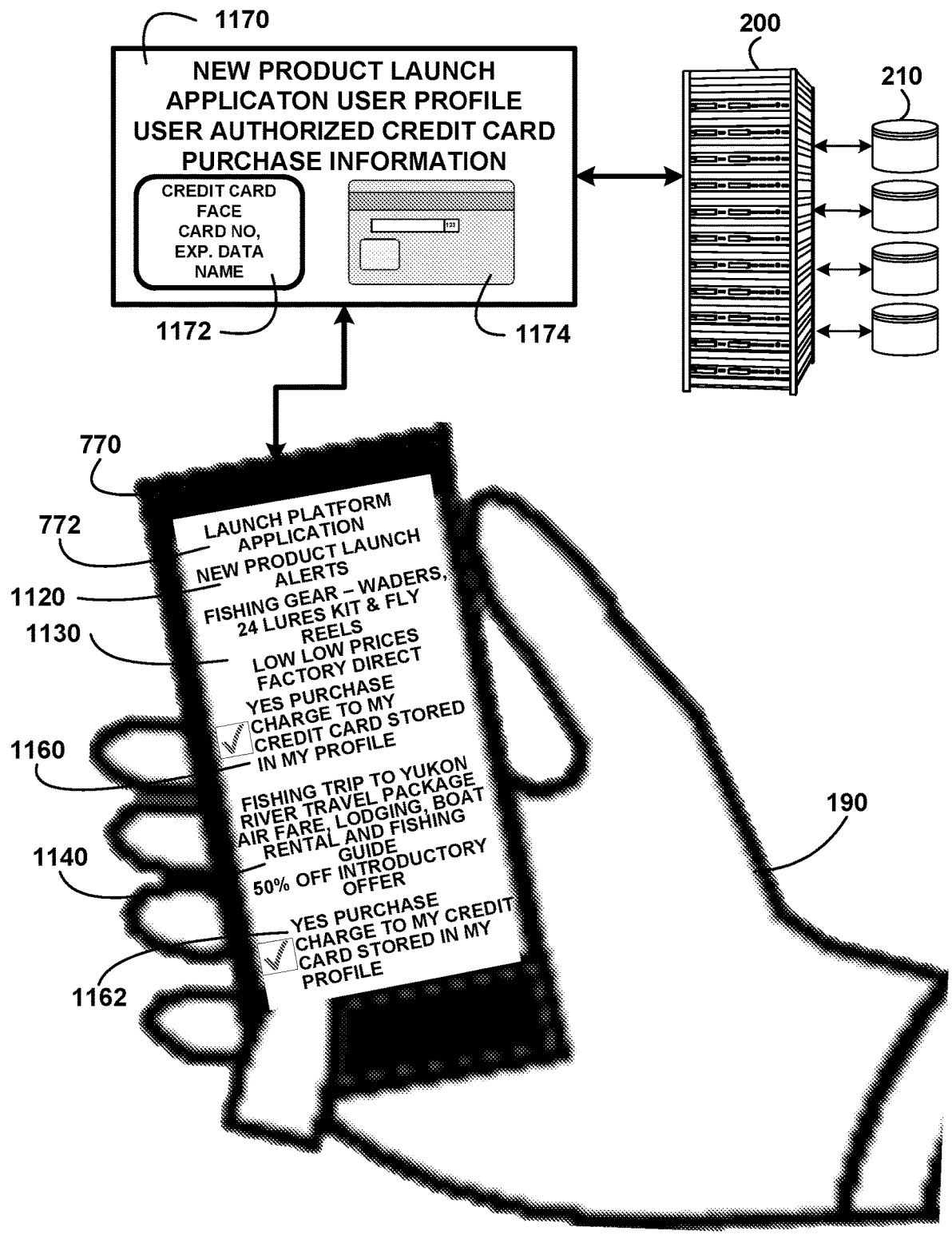
FIG. 11B shows for illustrative purposes only an example of user authorized credit card purchase information of one embodiment.

User Authorized Credit Card Purchase Information:

FIG. 11B shows for illustrative purposes only an example of user authorized credit card purchase information of one embodiment. FIG. 11B shows the network server 200 and the plurality of databases 210. The end user customer 190 may upload and record in their user profile the user's credit or bank card 1172 and back view with the security code 1174 data for use in making purchases. The user profile is protected with various security features including facial recognition, fingerprint match, signature match detection modules.

In this example the network server computer 716 processes the security features data entered by the end user customer 190 when logging in using the customer digital device 770 with the launch platform application 772. The previously ordered: sporting equipment, sports clothes, fishing gear, CBD oil, travel package deals, and women's gifts 1100 is used to provide the user with relevant new product launch alerts 1120.

The end user customer 190 reviews the new product launch alerts 1120 including the fishing gear—waders, 24 lures kit & fly reels low low prices factory direct 1130. The end user customer 190 checks the box to activate the yes purchase charge to my credit card stored in my profile 1160 option. The end user customer 190 reviews the new product launch alerts 1120 including the fishing trip to Yukon river travel package air fare, lodging, boat rental and fishing guide 50% off introductory offer 1140. The end user customer 190 checks the box to activate the yes purchase charge to my credit card stored in my profile 1162. The end user customer 190 has purchased the two new product launch products and services using the purchase convenience and security of the user's credit card stored in the user's profile of one embodiment.

Figure 12:
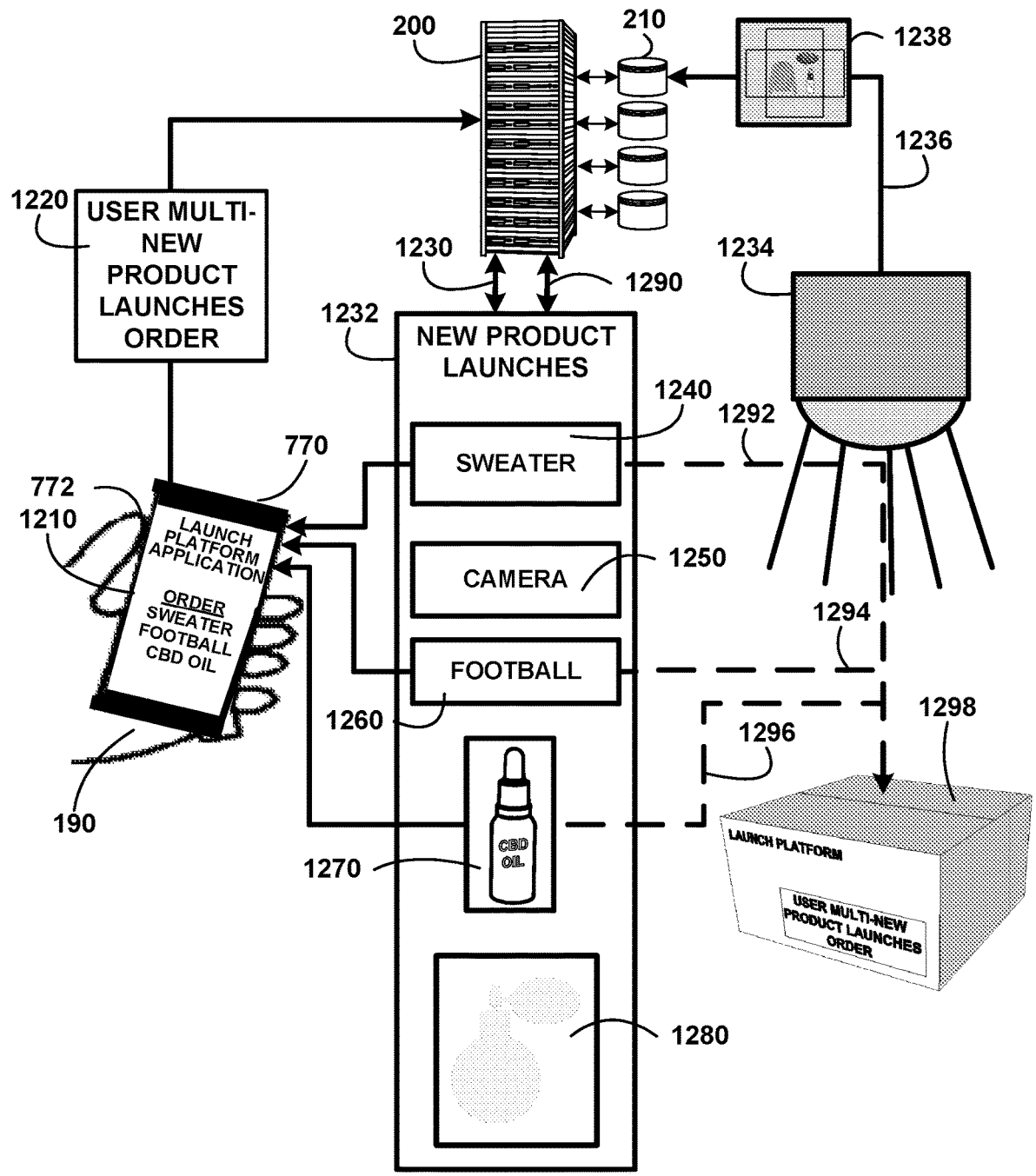
FIG. 12 shows for illustrative purposes only an example of user multi-new product launches order of one embodiment.

User Multi-New Product Launches Order:

FIG. 12 shows for illustrative purposes only an example of user multi-new product launches order of one embodiment. FIG. 12 shows the network server 200, plurality of databases 210 and the customer digital device 770 with the launch platform application 772 installed. The network server 200 transmits new product launches 1232 including a sweater 1240, camera 1250, football 1260, CBD oil 1270 and a spray bottle 1280 to the customer digital device 770.

After reviewing the new product launches 1232 the end user customer 190 places an order for a sweater, football, and CBD oil 1210.

The user multi-new product launches order 1220 is transmitted to the network server 200. The network server 200 automatically verifies the end user customer 190 payment and security data and processes and the order is sent to shipping 1230. The shipping department using robotic product modules to locate in a warehouse the particular new launch products order by the end user customer 190. The network server 200 records the new launch product identification numbers assigned to each product, the shelf position id, the weight and packaging type of each product 1290 and records those and other product details in the plurality of databases 210.

The robotic product modules using the product id data stores the product in the assigned warehouse shelf position id location. The number of the specific new product is also recorded in the plurality of databases 210. The number of each new product picked up from the assigned warehouse shelf position id location for shipping is also recorded including the date and time. The recorded storage and picked up data is processed by the artificial intelligence 120 utilizing at least one digital processor for the data analysis. This produces a sales analysis on the product that is reported to the advertiser of a new product 170 to alert the advertiser on the product demand and determine how many and when additional product units need to the made and shipped to the warehouse.

The sales analysis is also processed by the artificial intelligence 120 utilizing at least one digital processor to determine the effectiveness of the marketing efforts. The artificial intelligence 120 uses the data from the purchasing end users profiles to determine the demographics of the purchases as compared to the targeted marketing. The artificial intelligence 120 analysis creates suggested adjustments to the marketing strategy to reach higher potential purchasing conversion rates of the new launch product advertising placement.

The robotic product modules are configured to include various pickup devices including for example vacuum suction cups to lift soft packaged products, mechanical grippers to grab and lift boxed products, extendable ramps with conveyor devices to slide under heavier products and convey them onto a support scissor platform and other mechanisms that fit product characteristics.

The end user customer 190 new product launches 1232 ordered items picked up using the warehouse robotic product modules the sweater 1240, football 1260 and CBD oil 1270 are then packaged. The sweater is placed in the package container 1292, football is placed in the package container 1294, and CBD oil is placed in the package container 1296. The ordered new product launches 1232 items once in the delivery package 1298 are photographed using a shipping verification camera to capture an image of items being shipped 1234. The captured image transmitted to database 1236. The captured image 1238 provides verification of the actual items being shipped to the end user customer 190 of one embodiment.

Figure 13A:
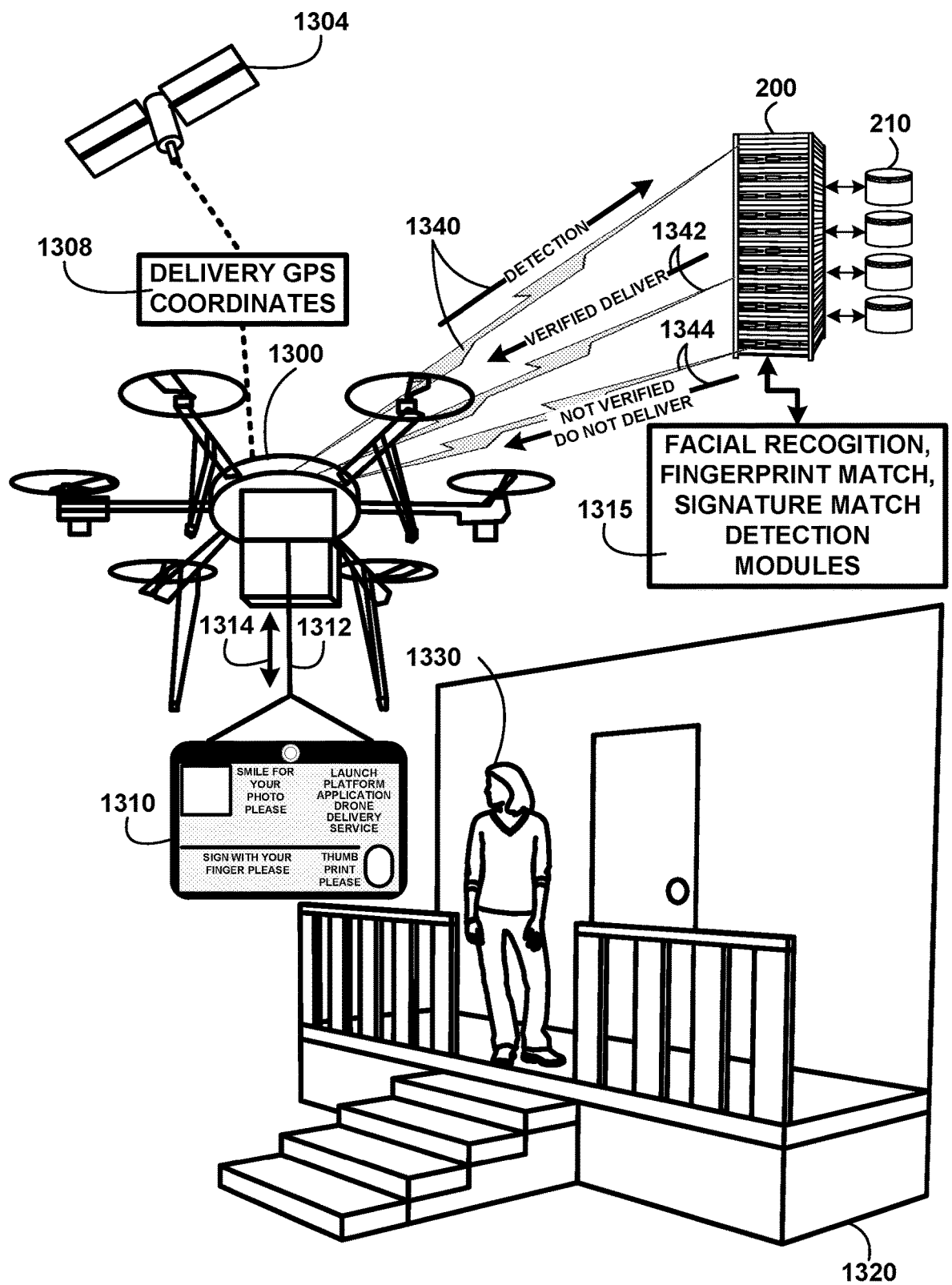
FIG. 13A shows for illustrative purposes only an example of drone delivery verification of one embodiment.

Drone Delivery Verification:

FIG. 13A shows for illustrative purposes only an example of drone delivery verification of one embodiment. FIG. 13A shows the network server 200 and plurality of databases 210. A launch platform delivery drone 1300 receives the location for the delivery, and end user identity data. That information is recorded in a digital memory device installed in the drone controller device. The delivery location includes the GPS coordinates and approximate elevation.

The artificial intelligence 120 of FIG. 1 utilizing at least one digital processor searches the maps of the area from the warehouse where the drone is loaded with the delivery package 1298 of FIG. 12. The artificial intelligence 120 of FIG. 1 determines the shortest and safest route for the drone to fly, including vertical obstacle avoidance for example electrical transmission lines, water towers, high rise building and restricted air space.

The flight plan including flight elevations is further analyzed by the artificial intelligence 120 of FIG. 1 for the complete flight time to and from the delivery point including approximate wait hover times at the delivery point to ensure the drone has sufficient battery charge to complete the entire flight time including an adequate safety margin allowance.

The launch platform delivery drone 1300 is configured to include at least one digital camera used to capture continuous images in all four directions including front, left, right, rear and down relative to the drone. The at least one digital camera is configured to include a digital range finder to determine the drone's distance to any obstacle in its flight path which is transmitted to the artificial intelligence 120 of FIG. 1 modules of the network server 200 to confirm drone flight adjustment to avoid the potential for a collision.

The launch platform delivery drone 1300 begins the flight keeping track of adherence to the determined flight plan with continuous position checks from a satellite GPS location signal 1304. When the launch platform delivery drone 1300 arrives at the delivery GPS coordinates 1308 the network server 200 transmits a delivery alert to the end user that the drone has arrived at the user selected delivery point. The delivery alert message includes a requested end user response that they are going outside to the delivery point to accept delivery and how many minutes to arrive at that delivery point with a limit on the time to arrive or the drone will not make the delivery and return.

In this example the delivery point is a user's house and front porch 1320. The user comes out on the front porch when drone arrives 1330. The end user arrival at the delivery point is recorded using the downward oriented camera. The launch platform delivery drone 1300 then lowers on a cable a launch platform application drone delivery verification tablet 1310. The shielded tablet access cable 1312 prevents electronic interference that may disrupt the digital data transmissions. The launch platform application drone delivery verification tablet 1310 displays a request for a thumb print please, smile for your photo please and sign with your finger please. The user tablet ID input detection signals 1340 are transmitted to the facial recognition, fingerprint match, signature match detection modules 1315 of the network server 200. The user tablet ID input detection signals 1340 are compared to the end user identification data in the user profile stored in the plurality of databases 210.

If the ID is positive the network server 200 transmits to the drone a verified deliver 1342 signal. If the ID verification is not positive the network server 200 transmits to the drone a not verified do not deliver 1344 signal to the drone and the launch platform application drone delivery verification tablet 1310 displays to the person trying to get delivery a non-verification message and that the delivery will not be made. The access cable extends and retracts to a user 1314.

In the case of a not verified do not deliver 1344 signal the access cable is retracted and the drone returns to the warehouse. In the case of a verified deliver 1342 signal the tablet displays a message for the user that the delivery package 1298 of FIG. 12 will be lowered shortly. The shielded tablet access cable 1312 is retracted and the delivery package 1298 of FIG. 12 lowering process begins as described in FIG. 13B of one embodiment.

Figure 13B:
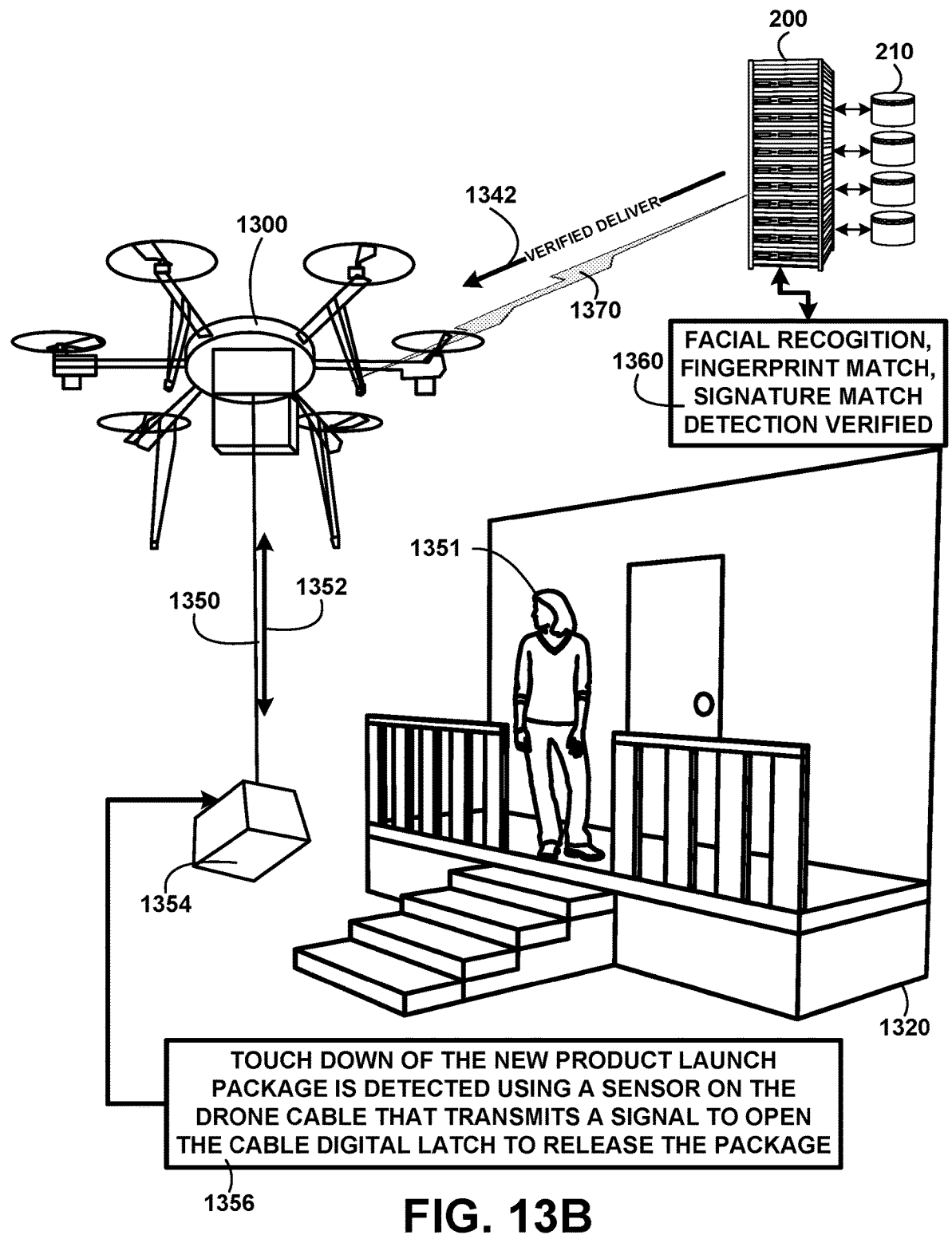
FIG. 13B shows for illustrative purposes only an example of drone delivery confirmation of one embodiment.

Drone Delivery Confirmation:

FIG. 13B shows for illustrative purposes only an example of drone delivery confirmation of one embodiment. FIG. 13B shows the network server 200 and plurality of databases 210. In this example the facial recognition, fingerprint match, signature match detection verified 1360. The verified deliver 1342 signal is transmitted to the launch platform delivery drone 1300. A delivery cable that may be lowered and retracted 1352 makes the physical delivery.

An activation delivery signal transmitted 1370 initiates the lowering of the delivery cable 1350 with the delivery container 1354 attached. Using the downward oriented digital camera digital range finder the delivery container 1354 in this example the delivery package 1298 of FIG. 12 is lowered to a position at ground level a slight distance from the user's house and front porch 1320. The user comes down from the front porch 1351 and picks up the delivery package 1298 of FIG. 12. The touchdown of the new product launch package is detected using a sensor on the drone cable that transmits a signal to open the cable digital latch to release the package 1356. The delivery cable 1350 is retracted and the drone returns to the warehouse of one embodiment.

Figure 14:
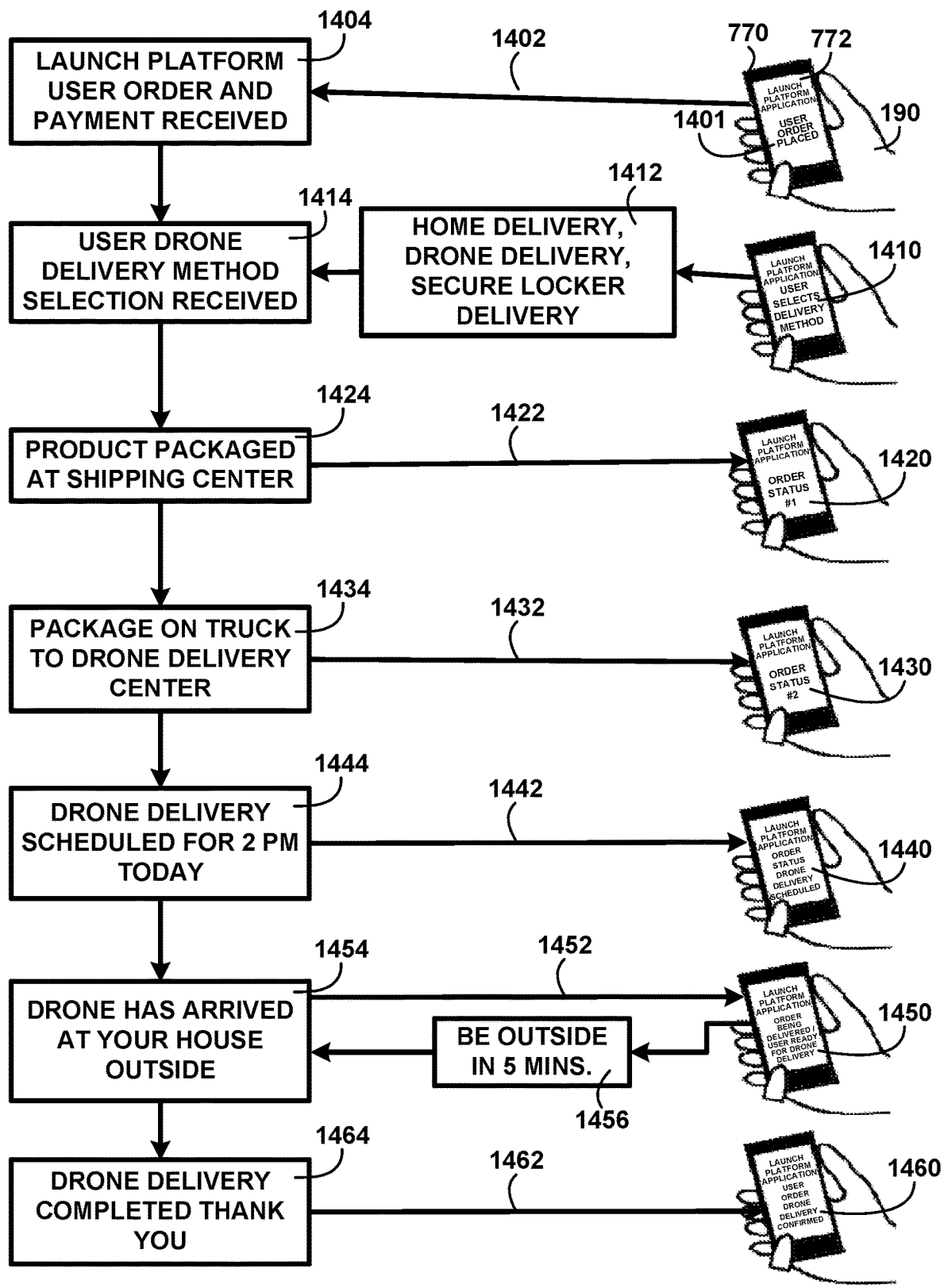
FIG. 14 shows for illustrative purposes only an example of drone delivery status alerts of one embodiment.

Drone Delivery Status Alerts:

FIG. 14 shows for illustrative purposes only an example of drone delivery status alerts of one embodiment. FIG. 14 shows the customer digital device 770 with the launch platform application 772 being used by the end user customer 190 for a user order placed 1401. The user order is transmitted to launch platform server 1402. The network server 200 of FIG. 2 records the launch platform user order and payment received 1404. The user selects delivery method 1410 from the delivery options including home delivery, drone delivery, secure locker delivery 1412. The user drone delivery method selection received 1414 by the network server 200 of FIG. 2.

The network server 200 of FIG. 2 communicates with the user through a series of status alerts. A product packaged at shipping center 1424 is transmitted in an order status #1 transmitted to user 1422. The order status #1 received by user 1420. Subsequent status alerts include a package on truck to drone delivery center 1434 is order status #2 transmitted to user 1432 and the order status #2 received by user 1430. A drone delivery scheduled for 2 pm today 1444 order status #3 transmitted to user 1442 and the order status drone delivery scheduled received by user 1440.

The drone has arrived at your house outside 1454 order status drone has arrived signal transmitted to user 1452. The status alert order being delivered/user ready for drone delivery 1450 is responded to by the user that the will be outside in 5 mins. 1456. The drone delivery completed thank you 1464 message order status delivery completed transmitted to user 1462 and responded to by the user order drone delivery confirmed 1460 response. The frequent status alerts keeps the user aware of the progress of getting delivery of their order and provides them with updates on the status to reduce any concerns they might have otherwise of one embodiment.

Figure 15:
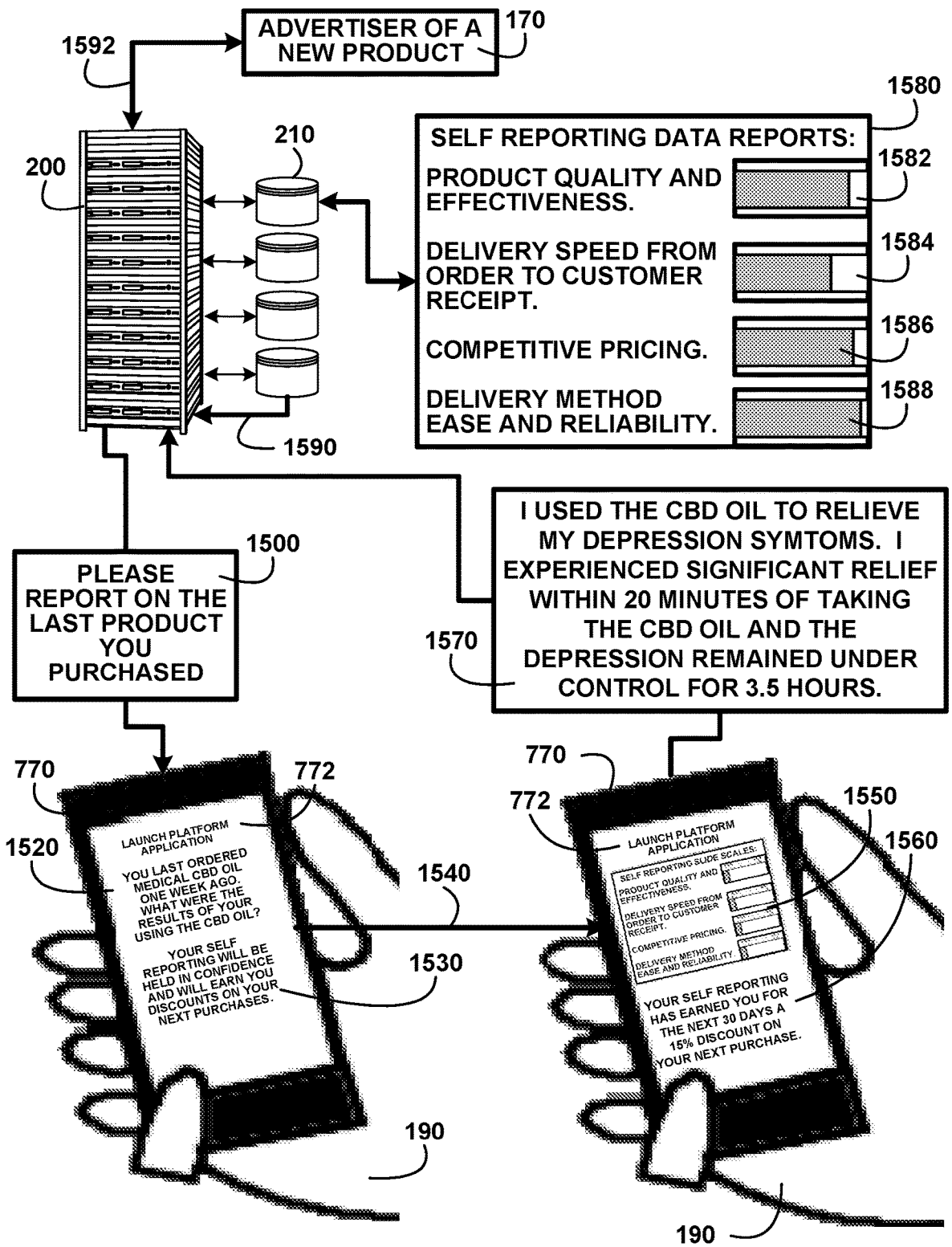
FIG. 15 shows for illustrative purposes only an example of self-reporting data reports of one embodiment.

Self-Reporting Data Reports:

FIG. 15 shows for illustrative purposes only an example of self-reporting data reports of one embodiment. FIG. 15 shows the network server 200 and plurality of databases 210 where the end user customer's previous orders 1590 are recorded. The network server 200 automatically transmits a please report on the last product you purchased 1500 to the end user customer 190 on the customer digital device 770 with the launch platform application 772. The request includes a reminder that you last ordered medical CBD oil one week ago.

The request includes at least one question what were the results of your using the CBD oil? 1520. The notification is that your self-reporting will be held in confidence and will earn you discounts on your next purchases. 1530. The end user customer elects to self-report 1540. The network server 200 transmits the self-reporting slide scales 1550 which are displayed on the customer digital device 770. The self-reporting slide scales 1550 quick easy to use method for the end user to make and send the self-reporting evaluations. The end user is asked to rate on the scale the product quality and effectiveness, delivery speed from order to customer receipt, competitive pricing, delivery method ease and reliability. The end user elected self-reporting is transmitted to the network server 200 and recorded in the plurality of databases 210.

After receiving the end user self-report the artificial intelligence 120 of FIG. 1 utilizing at least one digital processor calculates the discount and the network server 200 transmits the notification to the end user that self-reporting has earned you for the next 30 days a 15% discount on your next purchase. 1560.

The user self-reporting display includes a comments 1570 section. In this example the user comments I used the CBD oil to relieve my depression symptoms. I experienced significant relief within 20 minutes of taking the CBD oil and the depression remained under control for 3.5 hours. The end user customer self-report comment is transmitted to the network server 200. The end user customer's self-report is transmitted 1592 to the advertiser of a new product 170 for their uses in evaluating their product user acceptance and opinions on the product. The results of the self-report are added to the previous self-reporting to compile cumulative self-reporting data reports 1580.

The artificial intelligence 120 of FIG. 1 utilizing at least one digital processor performs an analysis of the particular new launch product self-reported criteria product quality and effectiveness 1582, delivery speed from order to customer receipt 1584, competitive pricing 1586, delivery method ease and reliability 1588 to determine whether the product for quality, pricing and consumer user results are acceptable and suggest adjustment where needed. The artificial intelligence 120 of FIG. 1 utilizing at least one digital processor performs an analysis of the new launch product handling processes including delivery are receiving end user acceptance and to determine any areas where improvement could be made and making suggestions on what the improvement may entail of one embodiment.

Figure 16:
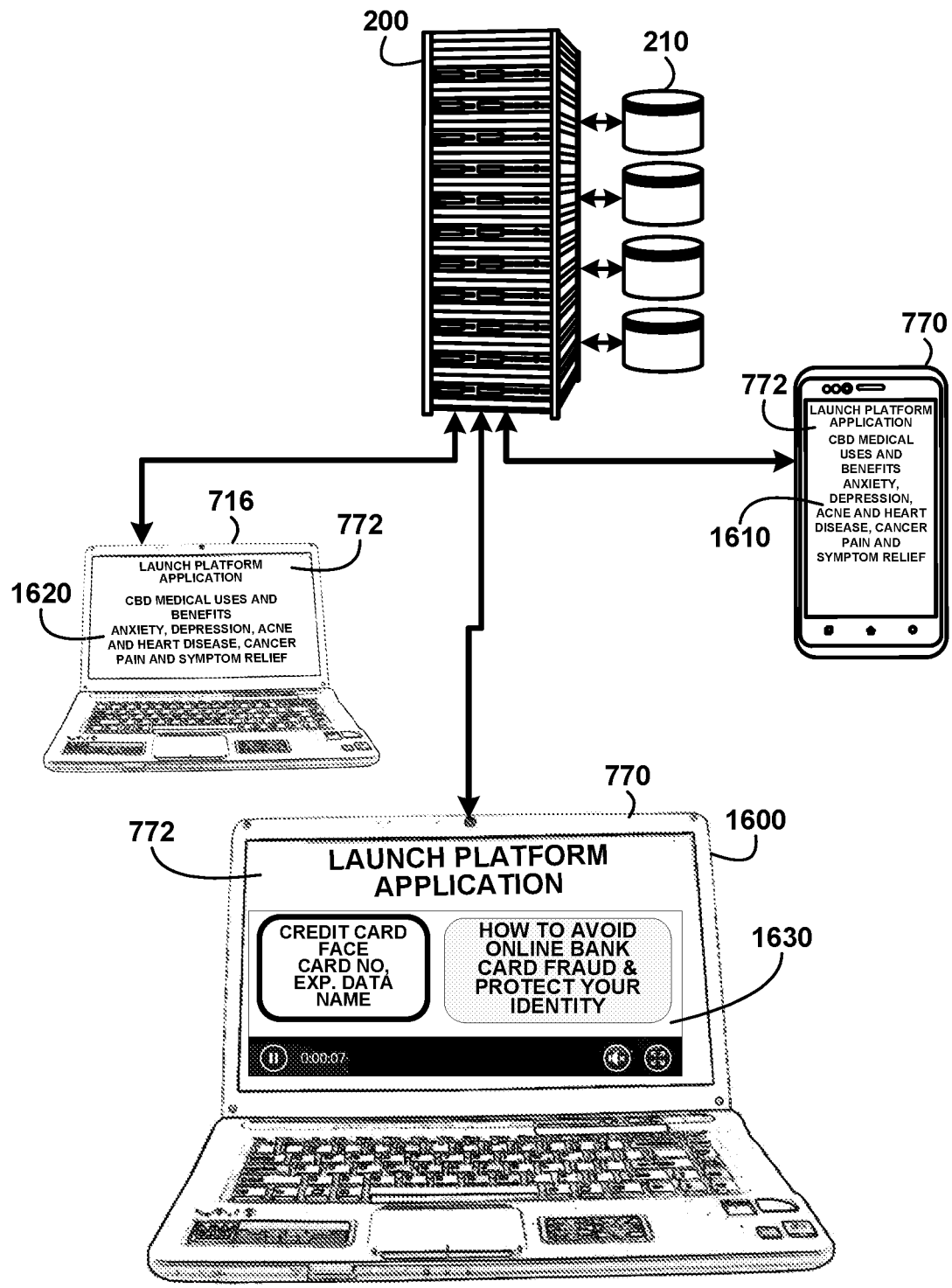
FIG. 16 shows for illustrative purposes only an example of CBD launch platform education and learning videos of one embodiment.

CBD Launch Platform Education and Learning Videos:

FIG. 16 shows for illustrative purposes only an example of CBD launch platform education and learning videos of one embodiment. FIG. 16 shows the network server 200 and plurality of databases 210. The network server computer 716 with the launch platform application 772 is additionally used to provide end users with educational and informative information.

For example the network server computer 716 may be used to transmit information from a user inquiry that CBD medical uses and benefits anxiety, depression, acne and heart disease, cancer pain and symptom relief 1620. In this example the response to the user submitted inquiry using the customer digital device 770 with the launch platform application 772 on a user's smart phone shows a display of the information that CBD medical uses and benefits anxiety, depression, acne and heart disease, cancer pain and symptom relief 1610.

In another example the customer digital device 770 with the launch platform application 772 may be a user's laptop computer 1600. The user may make an inquiry where a user enters a search for credit card fraud. In response the network server 200 transmits and the user receives a video to watch on how to avoid online bank card fraud & protect your identity 1630 from the network server computer 716 with the launch platform application 772 of one embodiment.

Figure 17:
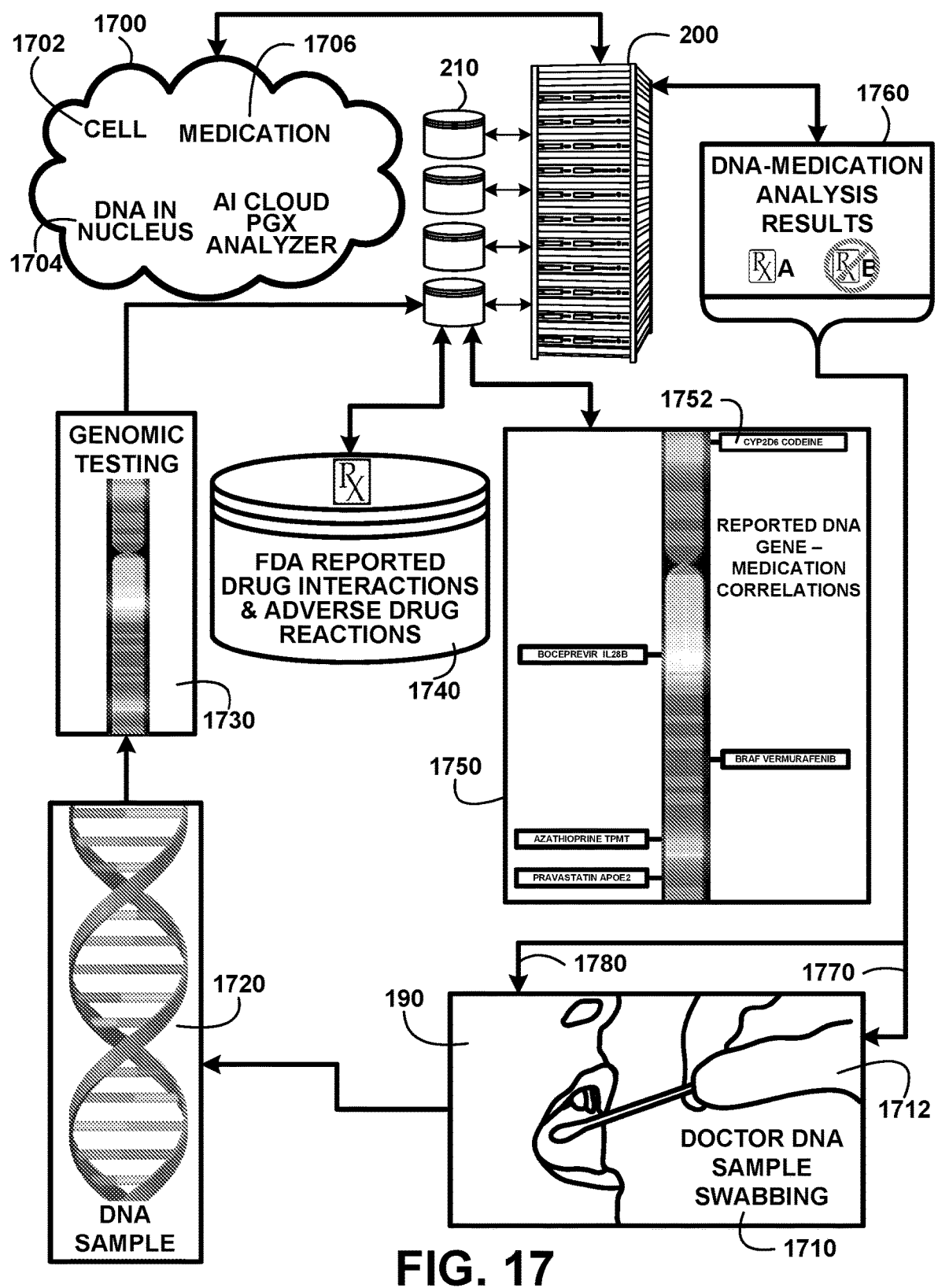
FIG. 17 shows for illustrative purposes only an example of DNA-medication analysis results of one embodiment.

DNA-Medication Analysis Results:

FIG. 17 shows for illustrative purposes only an example of DNA-medication analysis results of one embodiment. FIG. 17 shows the end user customer 190 in attendance by a doctor 1712 where the doctor DNA sample swabbing 1710 is made to provide a DNA sample 1720. Genomic testing 1730 is performed on the end user DNA sample 1720. The genomic testing 1730 results are transmitted and recorded in the network server 200 with the plurality of databases 210. The network server 200 performs on-going internet searches to gather information including FDA reported drug interactions & adverse drug reactions 1740 and reported DNA gene-medication correlations 1750. Search results are recorded in the plurality of databases 210. The artificial intelligence 120 of FIG. 1 utilizing at least one digital processor for the data analysis perform analysis of the genomic testing 1730 of the end user DNA sample 1720 and FDA reported drug interactions & adverse drug reactions 1740 and reported DNA gene-medication correlations 1750. The artificial intelligence 120 of FIG. 1 analysis produces for example identification of end user genetic markers that in one example find that cyp2d6 codeine 1752 does not benefit a user for pain relief as had been the expected result by the prescribing doctor. An AI cloud PGX analyzer 1700 analysis determines that the user cell 1702 with DNA in nucleus 1704 reacts in some instances with a medication 1706 in ways that might not have been anticipated by treating physicians. The AI cloud PGX analyzer 1700 DNA-medication analysis results 1760 are transmitted to the doctor 1770 and are transmitted to the end user customer 1780 of one embodiment.

Figure 18:
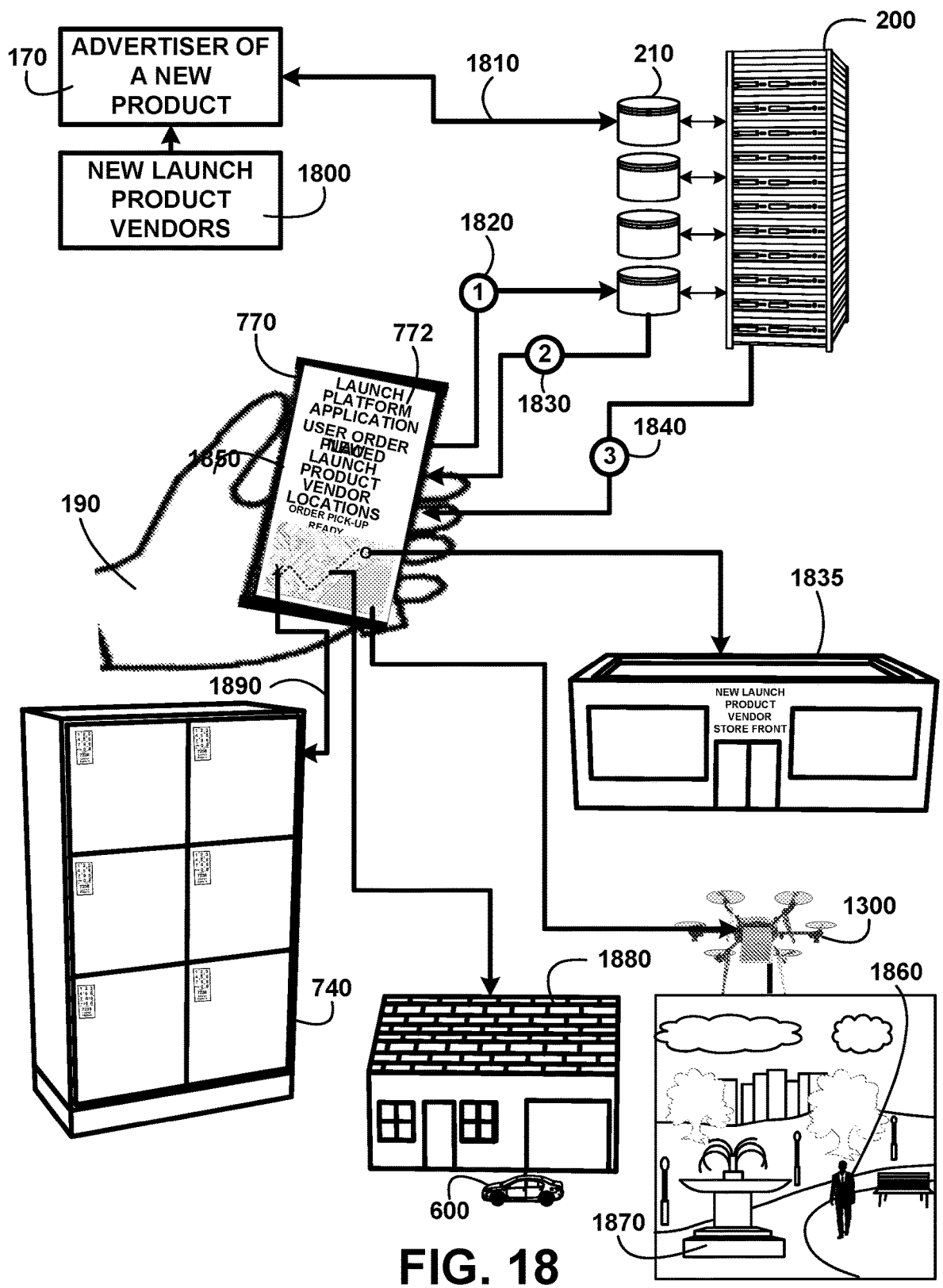
FIG. 18 shows for illustrative purposes only an example of new launch product vendors of one embodiment.

New Launch Product Vendors:

FIG. 18 shows for illustrative purposes only an example of new launch product vendors of one embodiment. FIG. 18 shows new launch product vendors 1800 contact information is supplied by at least one advertiser of a new product 170. The new launch product vendors 1800 contact information is transmitted 1810 to the network server 200 and recorded in the plurality of databases 210. An end user customer 190 using a customer digital device 770 with the launch platform application 772 may be out of town in one example. The end user customer 190 may perform a step #1 user order placed 1820. When the network server 200 receives the end user order and the user GPS location as transmitted by the customer digital device 770 launch platform application 772. The network server 200 based on the user GPS location performs a new launch product search for the product in the step #1 user order placed 1820 new launch product vendors 1800 contact information. The network server 200 processes and performs step #2 new launch product vendor location 1830 and transmits the vendor locations to the end user customer digital device 770 with the launch platform application 772. The network server 200 processes the step #1 user order placed 1820 to the step #2 new launch product vendor locations 1830. The network server 200 receives a response from the step #2 new launch product vendor locations 1830 that the order pick-up is ready. The network server 200 transmits step #3 order pick-up ready 1840 to the end user customer digital device 770 launch platform application 772. The step #3 order pick-up ready 1840 transmittal includes a street map with the user and the new launch product vender location marked on a street map 1850 which is displayed on the end user customer digital device 770. The out of town end user selected new launch product vendor store front pick-up point 1835. In other examples the out of town end user may select the launch platform delivery drone 1300. In this example an end user selected a new product launch drone delivery at a park 1860 is made to an open area park 1870. In a third example the out of town end user may select a friend's home where the out of town end user has selected a new product launch delivery 1880 by a CBD launch delivery vehicle 600. In a fourth example an end user selected a new product launch delivery at CBD launch platform delivery lockers 740. A map showing the location of the nearest CBD launch platform delivery lockers 740 with the end user locker pass code is transmitted to the end user customer digital device 770 with the launch platform application 772. The end user travels to the nearest CBD launch platform delivery lockers 740 and the out of town end user selected delivery to a CBD launch platform delivery locker 1890 is carried out by the user and performs the process to pick-up of the order of one embodiment.

Figure 19:
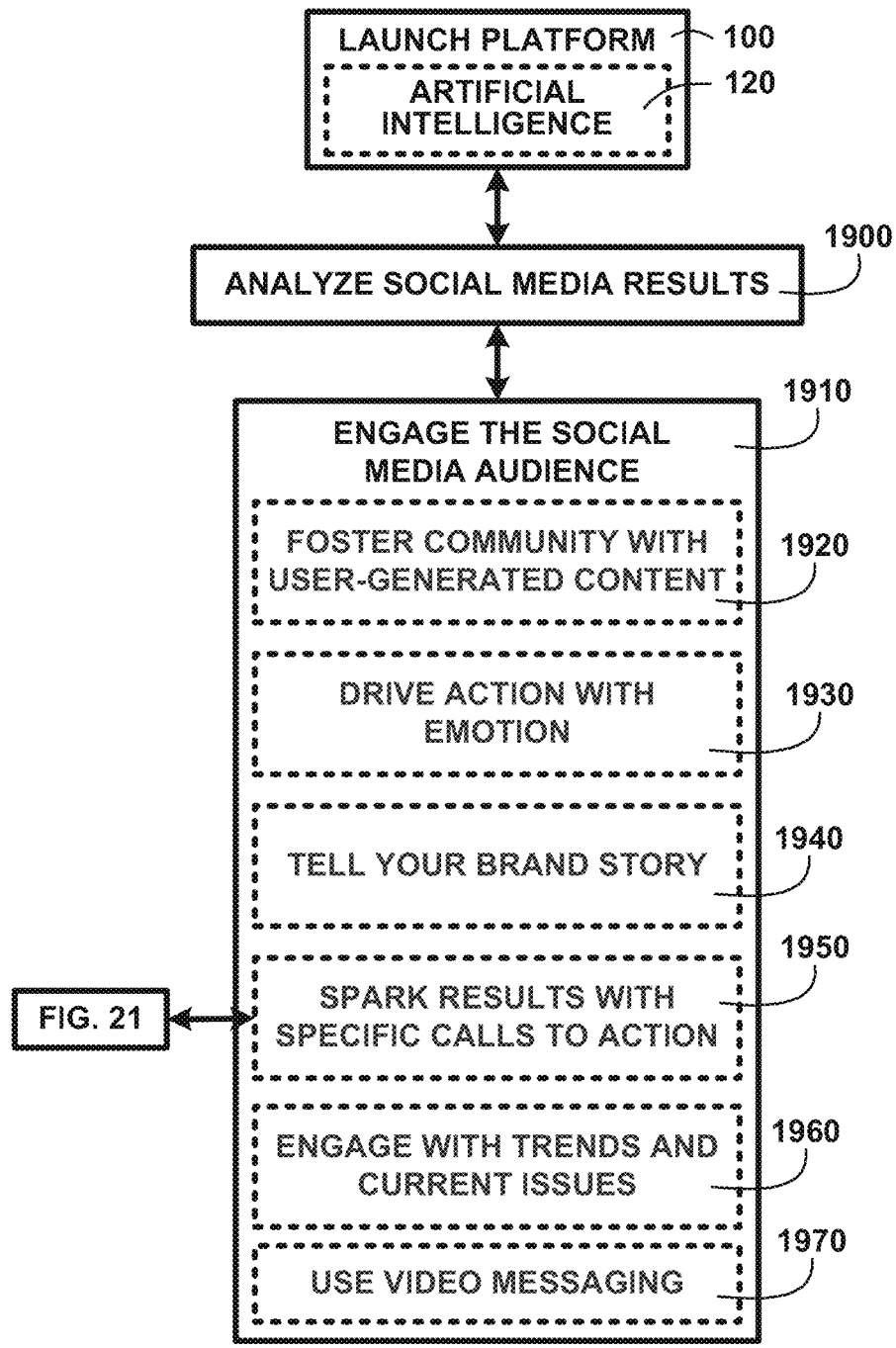
FIG. 19 shows a block diagram of an overview of analyze social media results of one embodiment.

Analyze Social Media Results:

FIG. 19 shows a block diagram of an overview of analyze social media results of one embodiment. FIG. 19 shows the launch platform 100 with artificial intelligence 120 that is used to analyze social media results 1900. The launch platform 100 with artificial intelligence 120 collects data on both new product launches and successful product sales analyzing the demographics of the conversion to sales and marketing strategies and tools used to produce the conversions.

Figure 21:
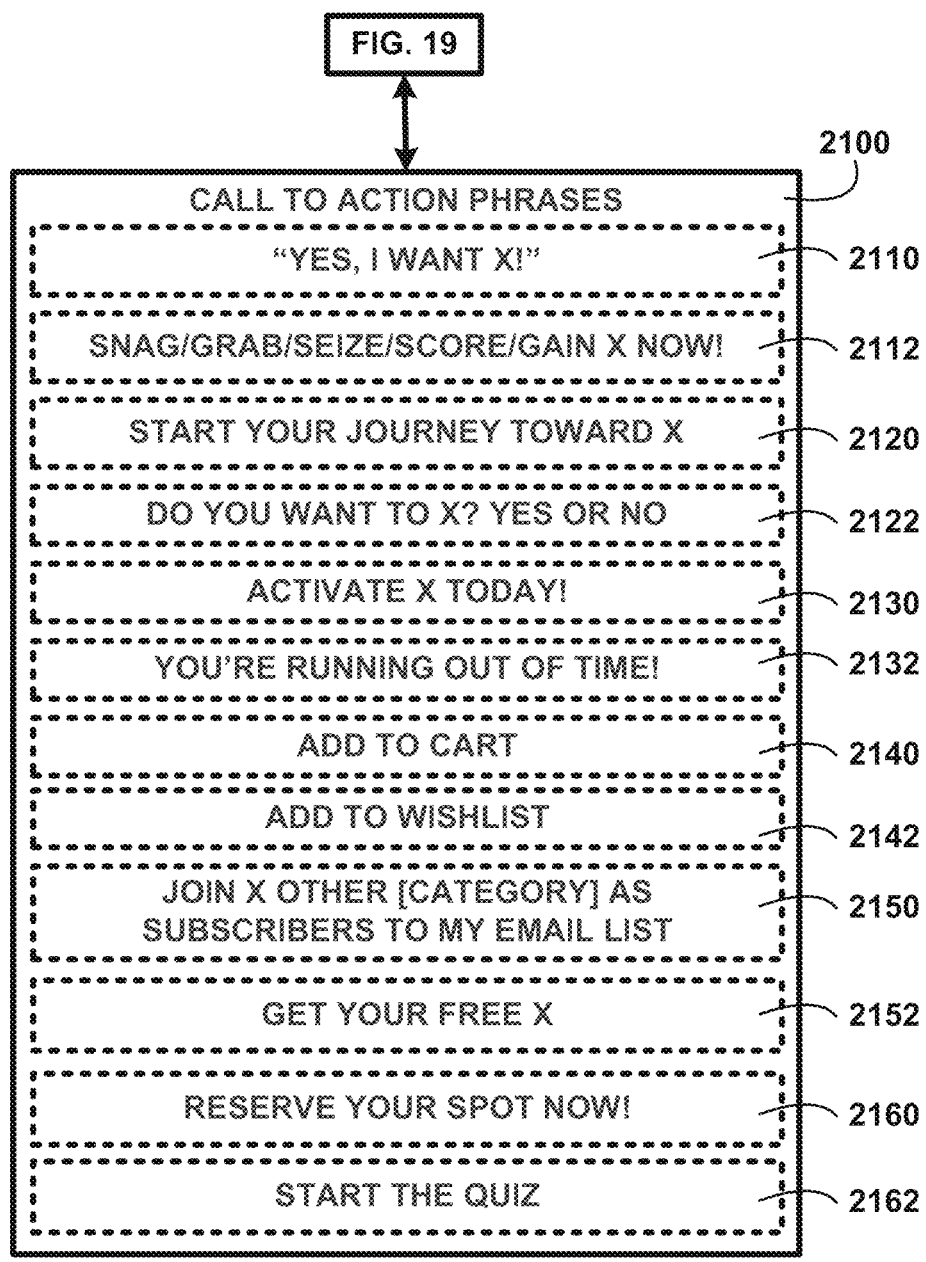
FIG. 21 shows a block diagram of an overview of call to action phrases of one embodiment.

In the current example the social media results include factors that include strategies to engage the social media audience 1910, foster community with user-generated content 1920, drive action with emotion 1930, tell your brand story 1940, spark results with specific calls to action 1950, further described in FIG. 21, engage with trends and current issues 1960 and use video messaging 1970 of one embodiment.

These social media results are used to create a social media style guide that is customizable to each new product that is to be launched. The social media style guide will be applied uniformly and consistently across all social media channels. The social media style guide will apply the results for establishing a description of your business or brand, buyer personas, a Logo and approved colors, posting formatting style, a language and writing policies to set a "voice" and tone for the marketing media and a customer service guide to make it easy for potential customers to make positive decisions to make a purchase of the newly launched product and convert the ad hit into a sale. The social media style guide will include a rough plan of what the ad content will look like over the next 3-6 months to provide post launch ad freshness of one embodiment.

Figure 20:
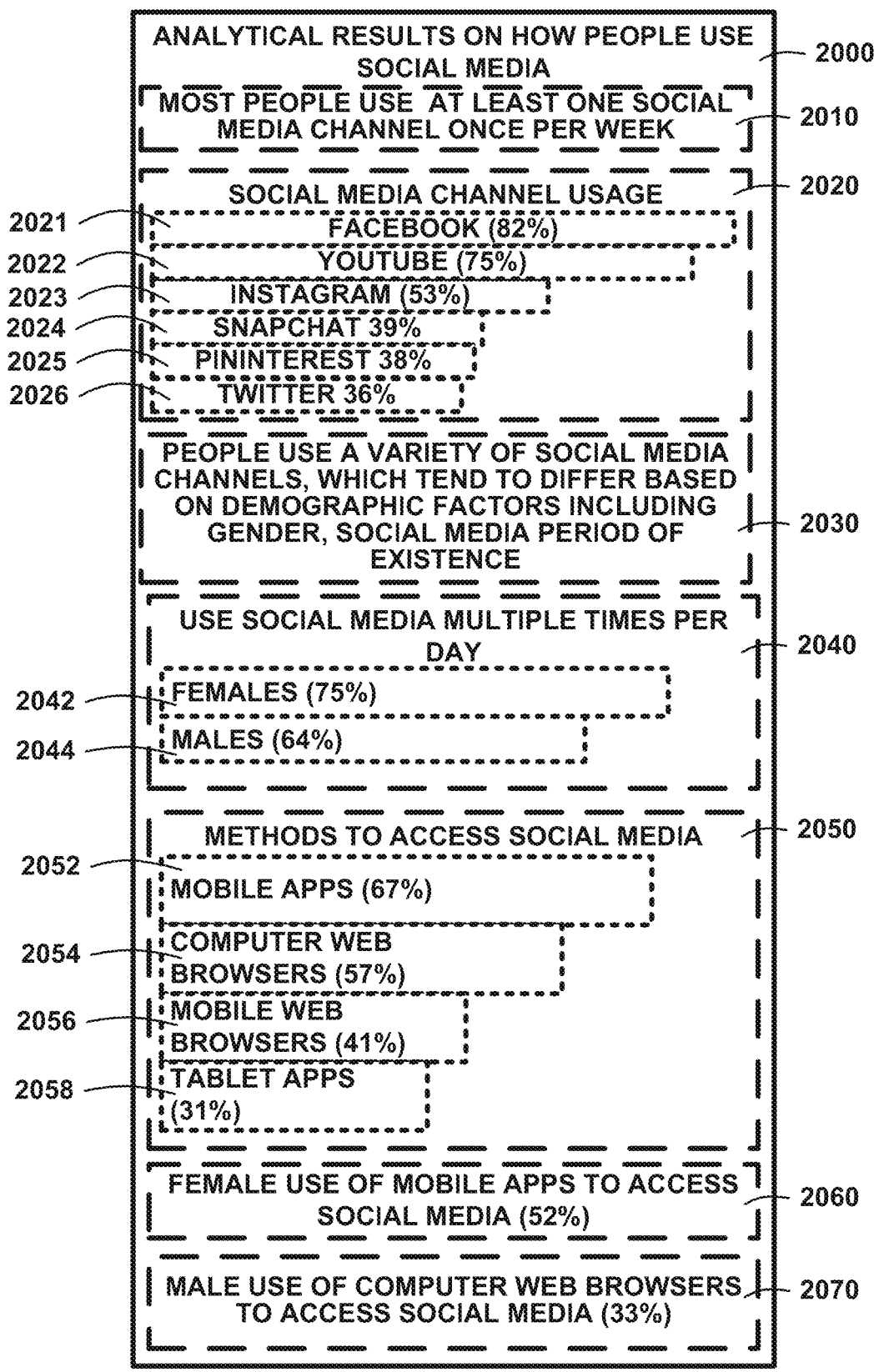
FIG. 20 shows a block diagram of an overview of analytical results on how people use social media of one embodiment.

Analytical Results on how People Use Social Media:

FIG. 20 shows a block diagram of an overview of analytical results on how people use social media of one embodiment. FIG. 20 shows analytical results on how people use social media 2000 generated using the launch platform 100 of FIG. 1 with artificial intelligence 120 of FIG. 1 and network server 200 of FIG. 2 and data collected and stored in the plurality of databases 210 of FIG. 2. FIG. 20 shows for example analytical results on how people use social media 2000 including most people use at least one social media channel once per week 2010. Social media channel usage 2020 results show Facebook (82%) 2021, YouTube (75%) 2022, Instagram (53%) 2023, Snapchat 39% 2024, Pinterest 38% 2025, And Twitter 36% 2026.

People use a variety of social media channels, which tend to differ, based on demographic factors including gender, social media period of existence 2030. Most people use social media multiple times per day 2040 for example females (75%) 2042 and males (64%) 2044.

People use various methods to access social media 2050 including for example mobile apps (67%) 2052; computer web browsers (57%) 2054, mobile web browsers (41%) 2056, and tablet apps (31%) 2058. The analyzed results show female use of mobile apps to access social media (52%) 2060 and male use of computer web browsers to access social media (33%) 2070. The analytical results on how people use social media 2000 allows the new product launch ad campaigns to target the probable demographic customers via the methods they prefer and social media channels they frequent the most of one embodiment.

Call to Action Phrases:

FIG. 21 shows a block diagram of an overview of call to action phrases of one embodiment. FIG. 21 shows a description of the social media results that indicate positive reactions that spark results with specific calls to action 1950 of FIG. 19 with a description of call to action phrases 2100. The call to action phrases 2100 include phrases that evoke positive action from the customer that include "yes, i want x!" 2110, snag/grab/seize/score/gain x now! 2112, start your journey toward x 2120, do you want to x? yes or no 2122, activate x today! 2130, you're running out of time! 2132, add to cart 2140, add to wishlist 2142, join x other [category] as subscribers to my email list 2150, get your free x 2152, reserve your spot now! 2160, and start the quiz 2162 of one embodiment.

The call to action phrases will speak your prospective customers' language to make them comfortable with what you are asking them to do. The lead into the call to action phrase will convey no risk in taking that action with the offer of guaranteed satisfaction, offer a free gift or future discounts to the customer directly or one they can send to a friend or family member of one embodiment.

Figure 22:
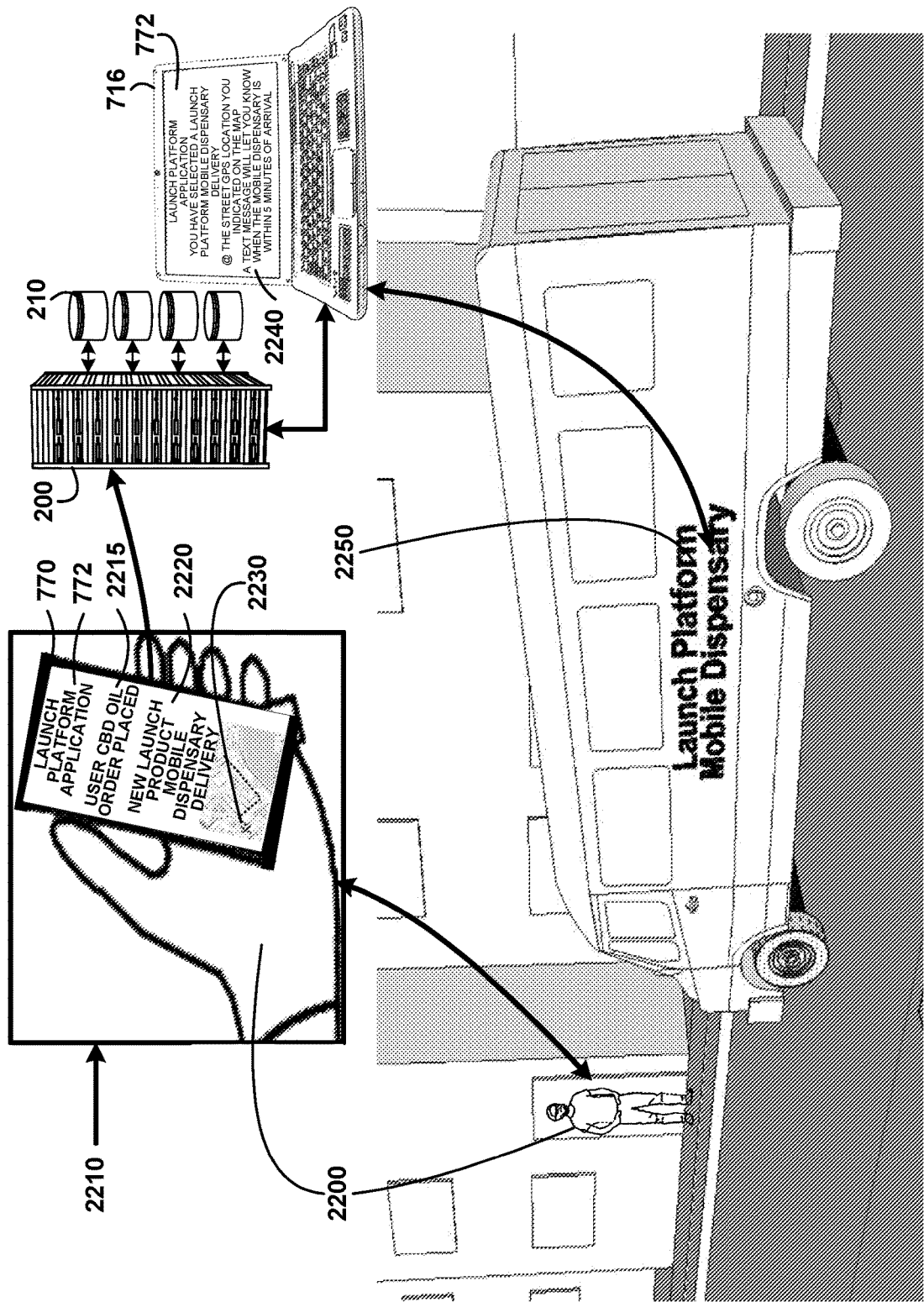
FIG. 22 shows for illustrative purposes only an example of launch platform mobile dispensary delivery of one embodiment.

Launch Platform Mobile Dispensary Delivery:

FIG. 22 shows for illustrative purposes only an example of launch platform mobile dispensary delivery of one embodiment. FIG. 22 shows a user 2200 placing a product order using the user's digital device with the launch platform application 2210 installed on the customer digital device 770. Displayed on the customer digital device 770 is the launch platform application 772 showing the user CBD oil order placed 2215. The user 2200 has selected a new launch product mobile dispensary delivery 2220 to a customer GPS delivery location 2230. The user's order payment is made automatically using the customer's bank card on record.

The user's order is received by the network server 200 and recorded in the plurality of databases 210. The network server computer 716 with the launch platform application 772 automatically transmits a confirmation to the user that you have selected a launch platform mobile dispensary delivery @ the street GPS location you indicated on the map, a text message will let you know when the mobile dispensary is within 5 minutes of arrival 2240.

The network server computer 716 transmits instructions for the delivery of the customer's order to a launch platform mobile dispensary 2250 in the area of the delivery street GPS location. The text is sent automatically to the customer's digital device when the time remaining for the delivery is calculated by the network server to be 5 minutes. When the launch platform mobile dispensary 2250 arrives, the user 2200 is at the GPS delivery location to accept the delivery.

Upon delivery to the user the launch platform mobile dispensary 2250 transmits confirmation that the delivery has be made. The network server computer 716 automatically transmits a question to the user's digital device 770 asking the customer to confirm receipt of the delivery of the CBD oil order of one embodiment.

Figure 23:
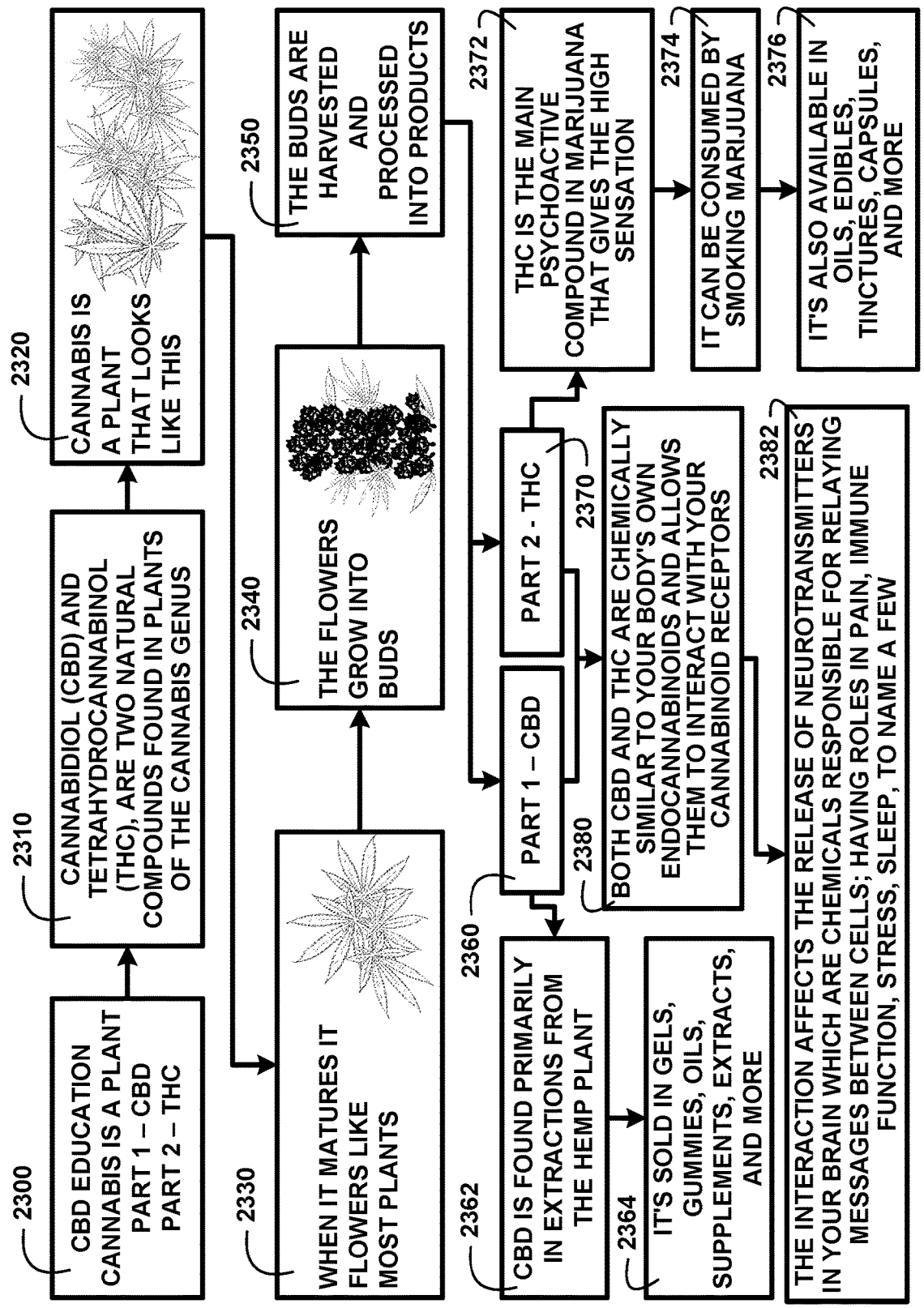
FIG. 23 shows for illustrative purposes only an example of CBD education of one embodiment.

CBD Education:

FIG. 23 shows for illustrative purposes only an example of CBD education of one embodiment. FIG. 23 shows an example from the product launch e-commerce website of CBD education 2300 materials that provides information that a customer may find useful in reviewing some of the products being marketed with the new product launch platform. The product launch e-commerce website of materials includes sections explaining to a customer that CBD education *Cannabis* is a plant part 1—CBD and part 2—THC 2300. The CBD education materials further explain that cannabidiol (CBD) and tetrahydrocannabinol (THC), are two natural compounds found in plants of the *Cannabis* genus 2310.

The product launch e-commerce website of materials CBD education materials include pictorial illustrations of what the plants look like as they mature. It shows *Cannabis* is a plant that looks like this (see picture) 2320. When it matures it flowers like most plants (see picture) 2330. The flowers grow into buds (see picture) 2340. The pictorial illustrations are helpful to customers who may not be familiar with *Cannabis* and can provide truly educational information on a subject matter that is in the news a great deal. The product launch e-commerce website CBD education materials further explain the buds are harvested and processed into products 2350.

One of the products is part 1—CBD 2360. CBD is found primarily in extractions from the hemp plant 2362. The hemp plant is a member of the *Cannabis* genus. The hemp plant is very low in THC content which in part is the reason it is legal under Federal law. The hemp based CBD is processed and it's sold in gels, gummies, oils, supplements, extracts, and more 2364 of one embodiment.

Another product from the non-hemp *Cannabis* plants is described in part 2—THC 2370 of the product launch e-commerce website CBD education materials. The CBD education explains that THC is the main psychoactive compound in marijuana that gives the high sensation 2372 and it can be consumed by smoking marijuana 2374. It's also available in oils, edibles, tinctures, capsules, and more 2376 of one embodiment.

Both CBD and THC are chemically similar to your body's own endocannabinoids and allows them to interact with your cannabinoid receptors 2380. The interaction affects the release of neurotransmitters in your brain which are chemicals responsible for relaying messages between cells; having roles in pain, immune function, stress, sleep, to name a few 2382 of one embodiment.

Figure 24:
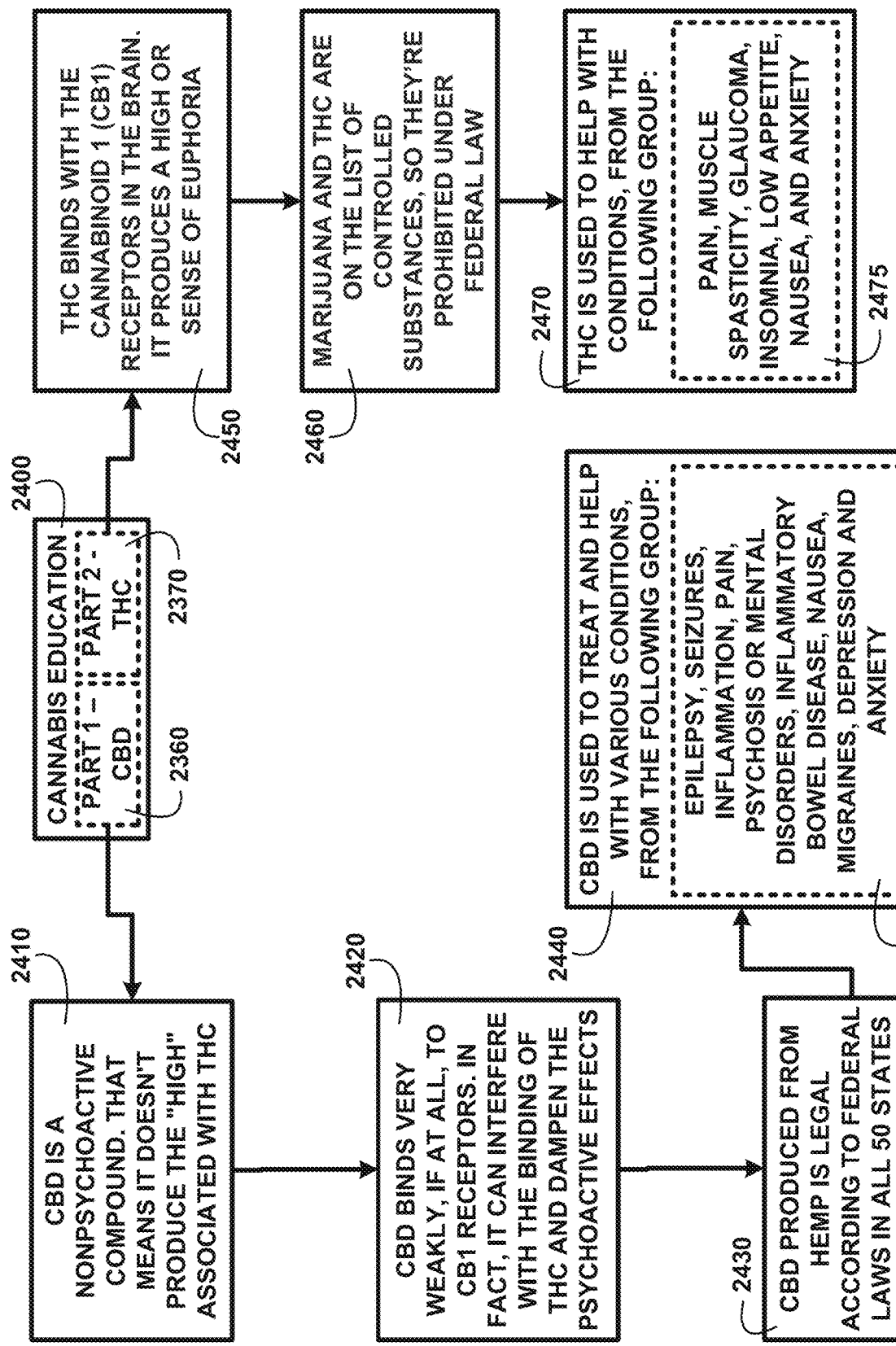
FIG. 24 shows a block diagram of an overview of *Cannabis* education of one embodiment.

*Cannabis* Education:

FIG. 24 shows a block diagram of an overview of *Cannabis* education of one embodiment. FIG. 24 shows an example of a *Cannabis* education 2400 article available to user customers on the product launch e-commerce website. The *Cannabis* education 2400 includes a part 1—CBD 2360 section that provides customer education that CBD is a nonpsychoactive compound that means it doesn't produce the "high" associated with THC 2410. CBD binds very weakly, if at all, to CB1 receptors and it can interfere with the binding of THC and dampen the psychoactive effects 2420. CBD produced from hemp is legal according to federal laws in all 50 states and territories 2430. CBD provides medical and health benefits to a consumer. CBD is used to treat and help with various conditions, from the following group: 2440 epilepsy, seizures, inflammation, pain, psychosis or mental disorders, inflammatory bowel disease, nausea, migraines, depression and anxiety 2445 of one embodiment.

The *Cannabis* education 2400 includes a part 2—THC 2370 that educates the customer that THC binds with the cannabinoid 1 (CB1) receptors in the brain and it produces a high or sense of euphoria 2450. Marijuana and THC are on the list of controlled substances, so they're prohibited under federal law 2460. A customer may check on the product launch e-commerce website to view the legal status of THC in their state as some states have legislated that it is legal within the state for medical and/or recreational use. THC provides medical and health benefits to a consumer. THC is used to help with conditions, from the following group: 2470 pain, muscle spasticity, glaucoma, insomnia, low appetite, nausea, and anxiety 2475 of one embodiment.

Figure 25:
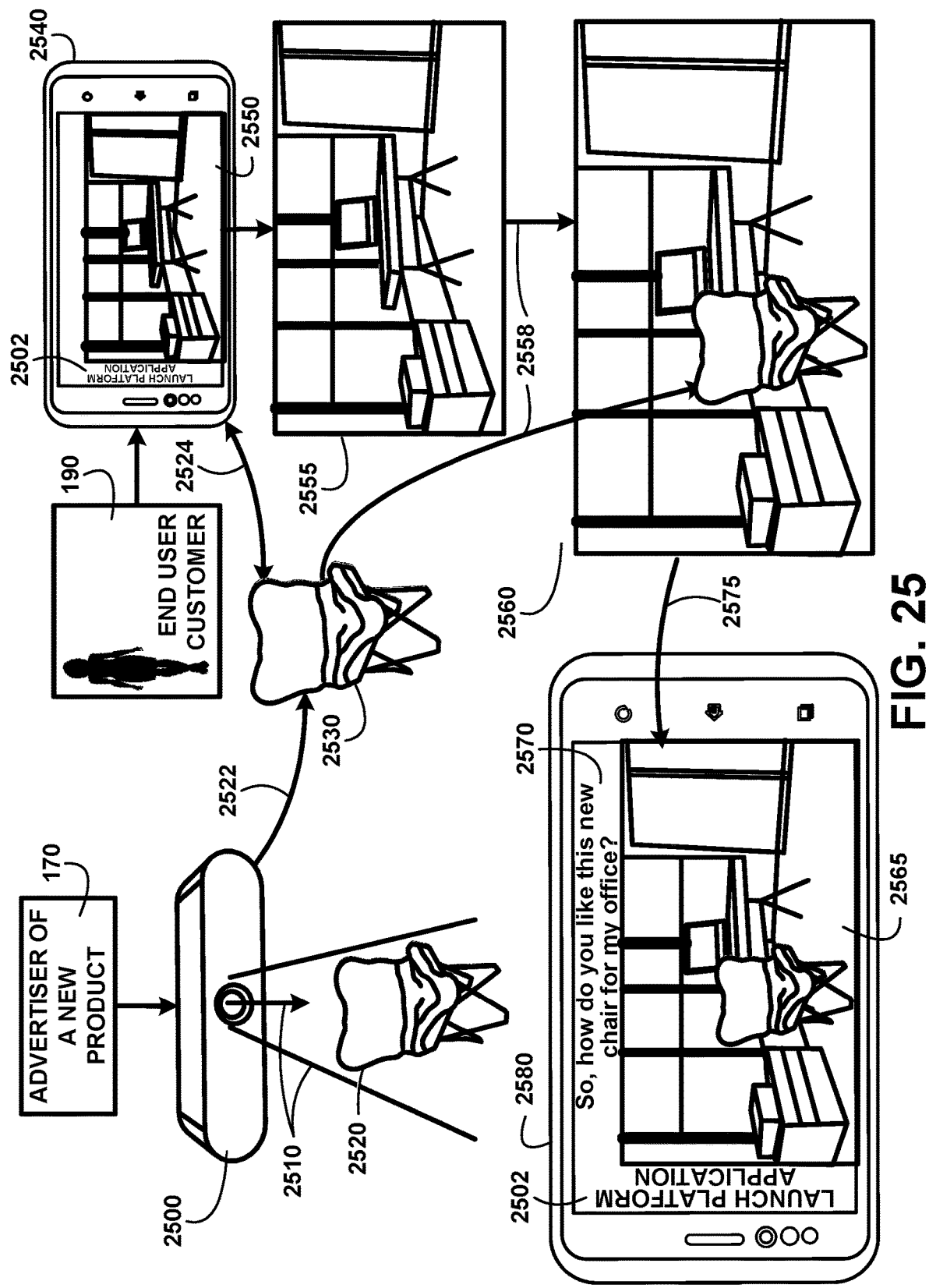
FIG. 25 shows for illustrative purposes only an example of 3D new product images of one embodiment.

3D New Product Images:

FIG. 25 shows for illustrative purposes only an example of 3D new product images of one embodiment. FIG. 25 shows the advertiser of a new product 170 using a depth sensing camera 2500 for capturing a 3D image of a new product 2510 for example a chair 2520. The end user customer 190 using an end user digital device with a depth sensing camera 2540 and a launch platform application with MR-VR-AR modes 2502 captures a 3D image of their office 2550. The end user customer downloads 2522 a chair new product 3D image 2530 and stores the 3D image in the launch platform application 2524. The end user customer 190 using the launch platform application MR mode places and positions the 3D chair image into office 3D image 2558. In the process of compositing the office 3D image 2555 and chair new product 3D image 2530 the end user customer may rotate the chair new product 3D image orientation and view the composite images in a 360 degree manner 2560 using the launch platform application with MR-VR-AR modes 2502. The composite real office and new product chair 3D virtual images scene is displayed in the launch platform application 2565.

The end user customer may send the composite 3D image to a friend to get their opinion 2575. The end user customer asks the friend "So, how do you like this new chair for my office?" 2570. The end user customer friend's digital device with a depth sensing camera 2580 with the launch platform application with MR-VR-AR modes 2502 may select one of the launch platform application with MR-VR-AR modes 2502. The composite real office and new product chair 3D images scene may be viewed in at least one of three modes MR, VR with VR goggles, and AR 2565.

Mixed reality (MR) also referred to hybrid reality—is the merging of real and virtual worlds to produce new environments and visualizations where physical and digital objects co-exist and interact in real time. Virtual reality (VR) which can be referred to as immersive multimedia or computer-simulated reality, replicates an environment that simulates a physical presence in places in the real world or an imagined world, allowing the user to interact in that world. The end user customer friend may use VR goggles to view the scene in 360°. Augmented Reality (AR) is a live, direct or indirect view of a physical, real-world environment whose elements are augmented (or supplemented) by computer-generated sensory input such as sound, video, graphics or GPS data. The offering of a 3D image of a new product allows an end user customer to also see for example how a piece of clothing would look on themselves, and other applications before making a final decision to purchase the new product of one embodiment.

The foregoing has described the principles, embodiments and modes of operation of the present invention. However, the invention should not be construed as being limited to the particular embodiments discussed. The above described embodiments should be regarded as illustrative rather than restrictive, and it should be appreciated that variations may be made in those embodiments by workers skilled in the art without departing from the scope of the present invention as defined by the following claims.

What is claimed is:

1. A method, comprising:
gathering and analyzing social media marketing data using a digital launch platform configured with at least one data processor for producing a marketing program comprising identified targeted consumer groups based on their demographics and their social media channel usage, purchasing preferences, and habits for use in launching new product;
wherein the social media marketing data includes data from new product launches and purchasing conversion rates;
performing a sales analysis on the social media marketing data using the at least one data processor for determining marketing effectiveness of new launch product advertising placement;
providing application programming interface systems on the digital launch platform for interfacing across multiple social media platforms for reaching consumers regardless of their user digital device type and operating system;
providing at least one digital launch platform user interface configured for consumer/end user online ordering and purchasing the new product;
performing an analysis of gathered social media marketing data for determining at least one influencer's connection with a new product target consumer group demographic;
delivering the new product order to the consumer/end user using a secure delivery system and devices electronically coupled to the digital launch platform selected from a group consisting of digital launch platform delivery lockers with delivery package label barcode scanning activated locker pass code key pads, and drone captured video of home and office deliveries and mobile dispensary consumer/end user GPS location deliveries; and
scanning the delivery package label barcode for activating a locker pass code key pad wherein a locker cabinet control processor receives an activation code from a digital launch platform network server for opening a digital circuit breaker to provide power to activate the locker pass code key pad for a predetermined time period.

2. The method of claim 1, further comprising performing an analysis of data for at least one ad media channel selected from one or more and combinations of TV, social media, website banner ads, and streaming video and the appeal of each of the ad media channels is driven by how often the ad media channels are viewed by various new product consumer groups.

3. The method of claim 1, further comprising using a digital launch platform advertiser login/dashboard interface for providing an advertiser of the new product communication interactively with the digital launch platform.

4. The method of claim 1, further comprising the digital launch platform using at least one database for data recording, ordering and purchase transactions, building a customer contact matrix and other data recording for query retrieval.

5. The method of claim 1, further comprising using the at least one digital launch platform user interface for communicating with the consumer/end user digital device selected from the group consisting of a computer, smart phones, tablet and digital electronic devices.

6. The method of claim 1, further comprising performing a sales analysis using at least one digital processor for determining marketing efforts effectiveness, wherein the at least one digital processor is configured for gathering data from purchasing consumer/end user profiles for determining demographics of purchasers as compared to targeted new product target consumer group demographics.

7. The method of claim 1, further using robotic product modules configured with various pickup devices including at least one configured with vacuum suction cups for lifting soft packaged products, and including at least one configured with mechanical grippers for grabbing and lifting boxed products, and including at least one configured with extendable ramps with conveyor devices for sliding under heavier products and conveying them onto a scissor platform.

8. The method of claim 1, further comprising embedding a radio-frequency identification (RFID) into the delivery package label for activating a delivery vehicle sensor that a delivery package with the delivery package label has been placed in that specific delivery vehicle and transmitting the placement data to a digital launch platform network computer.

9. The method of claim 1, further comprising reporting a delivery package delivery to the consumer/end user using a delivery driver's digital device with digital launch platform driver application and satellite and cellular connectivity.

10. The method of claim 1, further comprising using the digital launch platform configured to include a network server, a plurality of databases, a digital launch platform network computer with a digital launch platform application installed and at least one digital processor.

* * * * *